United States Patent
Le Roux et al.

(10) Patent No.: US 10,529,349 B2
(45) Date of Patent: Jan. 7, 2020

(54) METHODS AND SYSTEMS FOR END-TO-END SPEECH SEPARATION WITH UNFOLDED ITERATIVE PHASE RECONSTRUCTION

(71) Applicant: Mitsubishi Electric Research Laboratories, Inc., Cambridge, MA (US)

(72) Inventors: Jonathan Le Roux, Arlington, MA (US); John R Hershey, Winchester, MA (US); Zhongqiu Wang, Columbus, OH (US); Gordon P Wichern, Boston, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 15/983,256

(22) Filed: May 18, 2018

(65) Prior Publication Data

US 2019/0318754 A1 Oct. 17, 2019

Related U.S. Application Data

(60) Provisional application No. 62/658,567, filed on Apr. 16, 2018.

(51) Int. Cl.
*G06F 15/00* (2006.01)
*G10L 19/06* (2013.01)
(Continued)

(52) U.S. Cl.
CPC ............. *G10L 19/06* (2013.01); *G06N 3/08* (2013.01); *G10L 19/02* (2013.01); *G10L 21/0272* (2013.01); *G10L 25/30* (2013.01)

(58) Field of Classification Search
CPC .......... G01R 31/392; G10H 1/04; G10H 1/06; G10H 1/08; G10H 1/10–46; H03C 1/00;
(Continued)

(56) References Cited

U.S. PATENT DOCUMENTS

2006/0277035 A1* 12/2006 Hiroe .................. G10L 21/0272
704/203
2016/0071526 A1 3/2016 Wingate et al.
2018/0122403 A1* 5/2018 Koretzky ............ G10L 21/0272

OTHER PUBLICATIONS

Hershey et al ("Deep Clustering: Discriminative Embeddings for Segmentation and Separation", International Conference on Acoustic, Speech and Signal Processing ICASSP, Mar. 20-25, pp. 31-35 (Year: 2016).*

(Continued)

*Primary Examiner* — Leshui Zhang
(74) *Attorney, Agent, or Firm* — Gennadiy Vinokur; James McAleenan; Hironori Tsukamoto

(57) ABSTRACT

Systems and methods for an audio signal processing system for transforming an input audio signal. A processor implements steps of a module by inputting an input audio signal into a spectrogram estimator to extract an audio feature sequence, and process the audio feature sequence to output a set of estimated spectrograms. Processing the set of estimated spectrograms and the audio feature sequence using a spectrogram refinement module, to output a set of refined spectrograms. Wherein the processing of the spectrogram refinement module is based on an iterative reconstruction algorithm. Processing the set of refined spectrograms for the one or more target audio signals using a signal refinement module, to obtain the target audio signal estimates. An output interface to output the optimized target audio signal estimates. Wherein the module is optimized by minimizing an error using an optimizer stored in the memory.

21 Claims, 20 Drawing Sheets

(51) Int. Cl.
*G10L 21/0272* (2013.01)
*G10L 19/02* (2013.01)
*G06N 3/08* (2006.01)
*G10L 25/30* (2013.01)

(58) Field of Classification Search
CPC ........... H03C 3/00; G10L 19/04; G10L 19/06;
G10L 19/07; G10L 19/02; G10L 19/0204;
G10L 19/0208; G10L 19/0212; G10L
19/0216; G10L 19/022; G10L 19/025;
G10L 21/02; G10L 21/0272; G10L
21/028; G10L 21/0308; G10L 25/27;
G10L 25/30; G10L 25/33; G10L 25/36;
G10L 25/39; G10L 15/02; G10L 15/14;
G10L 17/00; G10L 11/00; G10L 21/04;
G10L 21/00; G10L 25/48; G10L
2015/025; G10L 13/043; G10L 25/18;
G10L 15/00; G10L 15/22; G10L 15/08;
G10L 15/1822; G10L 15/25; G10L 15/26;
G10L 15/265; G06N 3/08; G06N 3/082;
G06N 3/084; G06N 3/086; G06N 3/088;
G06F 17/28; G06F 17/30743; G06F
17/30746; G06F 17/30749; G06F 3/0484;
G06F 3/0481; G06F 3/0482; G06F
3/04842; G06F 3/0488; G06F 17/00;
H03G 3/00; H04R 29/00; H04R 3/04;
H04R 2227/005; H04R 7/045; H04L
12/1813; H04M 3/568
USPC ..... 381/56, 58, 59, 98, 316, 320, 71.1, 71.4,
381/71.11, 71.12, 71.14, 73.1, 80, 101,
381/102, 103; 84/692, 693–699,
84/700–717; 700/94; 704/9, 200, 270,
704/E19.01, E19.013, E19.024, E19.025,
704/E21.011; 379/88.01, 88.02,
379/88.04–88.08, 88.16, 88.18
See application file for complete search history.

(56) References Cited

OTHER PUBLICATIONS

David Gunawan et al "Music Source Separation Synthesis using Multiple Input Spectrogram Inversion", 2009 IEEE Internatinoal Workshop on Multimedia Signal Processing, Oct. 5-7, pp. 1-5 (Year: 2009).*

Prusa et al "A Non-iterative Method for (Re)Construction of Phase from STFT Magnitude", IEEE/ACM Transactions on Audio, Speech, and Language Processing, Sep. 1, pp. 1-10 (Year: 2016).*

Nugraha et al., "Multichannel Audio Source Separation with Deep Neural Networks," IEEE ACM Transactions on Aufio, Speech and Language Processing, vol. 24, No. 9. Sep. 1, 2016. pp. 1652-1664.

Wang et al., "Alternative Objective Functions for Deep Clustering, IEEE International Conference on Acoustics, Speech and Signal Processing." Apr. 15, 2018. pp. 686-690.

Zhong et al., End to End Speech Separation with Unfolded Iterative Phase Reconstruction, Interspeech 2018. Sep. 2, 2018. pp. 2708-2712.

Wichem et al., "Phase Reconstruction with Learned Time Frequency Representations for Single Channel Speech Separation," 2018 16th International Workshop on Acoustic Signal Enhancement. Sep. 17, 2018. pp. 396-400.

* cited by examiner

METHODS AND SYSTEMS FOR END-TO-END SPEECH SEPARATION WITH UNFOLDED ITERATIVE PHASE RECONSTRUCTION

FIELD

The present disclosure relates generally to audio signals, and more particularly to using an end-to-end approach for single-channel speaker-independent multi-speaker speech separation.

BACKGROUND

In some conventional speech separation and speech enhancement applications, processing is done in a time-frequency representation such as the short-time Fourier transform (STFT) domain. The STFT obtains a complex domain spectro-temporal (or time-frequency) representation of the signal. The STFT of the observed noisy signal can be written as the sum of the STFT of the target speech signal and the STFT of the noise signal. The STFT of signals are complex and the summation is in the complex domain.

However, most of these conventional speech separation and speech enhancement applications only conduct separation on the magnitude in the time-frequency (T-F) domain and directly use mixture phase for time-domain re-synthesis, largely because phase itself is very random and hard to be enhanced. It is well-known that this approach incurs a phase inconsistency problem, especially for speech processing, where there is typically at least half overlap between consecutive frames. This overlap makes the STFT representation of a speech signal highly redundant. As a result, the enhanced STFT representation obtained using the estimated magnitude and mixture phase would not be in the consistent STFT domain, meaning that it is not guaranteed that there exists a time-domain signal having that STFT representation.

In other words, with these conventional methods, the phase is ignored and these conventional methods assumed that the magnitude of the STFT of the observed signal, equals to the sum of the magnitudes of the STFTs of the target audio and the noise signals, which is a crude or poor assumption. Hence, the focus in the conventional speech separation and speech enhancement applications has been on magnitude prediction of the "target speech" given a noisy speech signal as input, or on magnitude prediction of the "target sources" given a mixture of audio sources as input. During reconstruction of the time-domain enhanced signal from its STFT, the phase of the noisy signal is used as the estimated phase of the enhanced speech's STFT, by these conventional speech separation and speech enhancement applications.

Accordingly, there is need to improve speech separation and speech enhancement applications using an end-to-end approach for single-channel speaker-independent multi-speaker speech separation.

SUMMARY

The present disclosure relates generally to audio signals, and more particularly to using an end-to-end approach for single-channel speaker-independent multi-speaker speech separation.

Some embodiments of the present disclosure use an end-to-end approach for single-channel speaker-independent multi-speaker speech separation, where spectrogram estimation using time-frequency (T-F) masking, the short-time Fourier transform (STFT), and its inverse are represented as layers within a deep network. Other types of spectrogram estimation and other time-frequency transforms and inverse transforms can be considered as well.

Some embodiments of the present disclosure use an end-to-end speech separation algorithm that trains through iterative phase reconstruction via time-frequency (T-F) masking for signal-level approximation. This end-to-end speech separation algorithm was realized through experimentation. Several approaches during experimentation conducted separation on the magnitude in the T-F domain and directly use the mixture phase for time-domain re-synthesis, largely because phase is difficult to estimate. However, these particular approaches resulted in a phase inconsistency problem, especially for speech processing, where there is typically at least half overlap between consecutive frames. This overlap makes the short-time Fourier transform (STFT) representation of a speech signal highly redundant. As a result, the enhanced STFT representation obtained using the estimated magnitude and mixture phase would not be in the consistent STFT domain, meaning that it is not guaranteed that there exists a time-domain signal having that STFT representation.

To improve the consistency, experimentation continued using some approaches focused on iterative methods, such as using classic Griffin-Lim algorithm, multiple input spectrogram inversion (MISI), Informed Source Separation Using Iterative Reconstruction (ISSIR), and consistent Wiener filtering, which resulted in recovering a more consistent phase to some extent, starting from the mixture phase and a good estimated magnitude, by iteratively performing STFT and iSTFT.

Some other experimentation approaches included applying iterative algorithms as a post-processing step on the magnitudes produced by deep learning based speech enhancement and separation. However, these other approaches typically only lead to small improvements, even though the magnitude estimates from deep neural network (DNN) were reasonably good. Which upon reflection, was believed that this is possibly because the T-F masking can be performed without being aware of the later phase reconstruction steps, and hence may not produce spectral structures that are appropriate for iterative phase reconstruction. It was later realized from experimentation of developing an end-to-end speech separation approach, where time-frequency (T-F) masking, the short-time Fourier transform (STFT), and its inverse can be represented as layers within a deep network.

Part of the realization was gained from several experimentation approaches that used a surrogate loss based on the target STFT magnitudes. However, this particular approach resulted in ignoring the reconstruction error introduced by phase inconsistency. Thus, it was realized that a total loss needs to include a loss computed on the reconstructed signal, in particular, the loss function can be directly defined on the reconstructed signals, which can be optimized for best separation. Further realized was that other losses on the reconstructed signals could be used, such as a loss involving the STFT of the reconstructed signal, or a loss involving the output of a speech recognition system or a sound classification system given the reconstructed signals as input. Further realized is that training can be through unfolded iterations of a phase reconstruction algorithm, represented as a series layers including STFT and inverse STFT layers. While mask values are typically limited to lie between zero and one for approaches using the mixture phase for reconstruction, this limitation is less relevant if the estimated magnitudes are to be used together with phase reconstruction. Further realized was thus that mask values not limited to lie between zero and one, and in particular being larger than one, can be beneficial. Further still, another realization included several activation functions that can be used for the output layer of the T-F masking, so as to allow mask values beyond one.

For example, some embodiments of the present disclosure provide several activation functions for the output layer of time-frequency masking to produce mask values that can go beyond one, which is at least one key aspect, to produce an estimated magnitude that is close to the consistent STFT domain.

Some embodiments of the present disclosure include training a deep neural network (DNN)-based enhancement system through a phase reconstruction stage. Wherein, the network or DNN-based enhancement system estimates a magnitude spectrogram, which is paired with the phase of a noisy mixture to obtain a complex spectrogram estimate. That complex spectrogram estimate is refined by a spectrogram refinement module. For example, the noisy phase can be far from being consistent with the estimated magnitude, in the sense that the magnitude of the reconstructed time-domain signal (i.e. obtained by inverse STFT of the complex spectrogram consisting of the product of the estimated magnitude and the noisy phase), is different from the original estimated magnitude. To improve upon the noisy phase according to some embodiments of the present disclosure, is to apply phase reconstruction algorithms in the spectrogram refinement module, to obtain refined spectrograms for which the estimated phase is more consistent with the estimated magnitude. These algorithms rely on iterative procedures where the phase at the previous iteration is replaced by a phase obtained from a computation involving applying to the current complex spectrogram estimate (i.e., product of the original estimated magnitude with the current phase estimate) an inverse STFT followed by an STFT, and retaining the phase only. For example, the Griffin & Lim algorithm applies such a procedure on a single signal. When multiple signal estimates that are supposed to sum up to the original noisy signal are jointly estimated, the multiple input spectrogram inversion (MIST) algorithm can be used. Accordingly, embodiments of the present disclosure train the network or DNN-based enhancement system to minimize an objective function including losses defined on the outcome of one or multiple steps of such iterative procedures.

For example, an objective function of the present disclosure can include a Waveform Approximation, which considers a distance between a reconstructed time-domain signal and the true target signal. Another objective function of the present disclosure can include a loss defined as a distance between the magnitude of a reconstructed time-domain signal and that of the true target signal.

Some embodiments of the present disclosure use an end-to-end speech separation algorithm that trains through iterative phase reconstruction via Time-Frequency (T-F) masking for waveform-level approximation. For example, some embodiments use an end-to-end approach for monaural speaker-independent multi-talker speech separation, where time-frequency masking, STFT and iSTFT are all represented as various layers on top of a bi-directional LSTM. Wherein, waveform-level loss functions can be directly optimized to improve speech separation. In addition, the present disclosure includes unfolding the iterations in iterative phase reconstruction algorithms as a series of STFT and iSTFT (including analysis windowing, synthesis windowing, and DFT operations) layers, to guide a bidirectional Long Short-Term Memory (BLSTM), to produce good estimated magnitudes that can elicit better phase after performing iterative phase reconstruction. A BLSTM is a pair of Long Short-Term Memory (LSTM) recurrent neural networks (RNNs), one is a forward LSTM and the other is a backward LSTM. A hidden vector of the BLSTM can be obtained as a concatenation of hidden vectors of the forward and backward LSTMs.

Some embodiments of the present disclosure include further consider unfolding the iterations in iterative phase reconstruction algorithms as a series of STFT and iSTFT (including analysis windowing, synthesis windowing, and DFT operations) layers, considering parameters of steps of the iterative phase reconstruction algorithms normally considered fixed, such as the analysis and synthesis windows of the STFT and the Fourier matrix of the DFT transform, as variables that can be trained, untying these variables across layers by considering them as separate variables each time they appear, and including these variables in the network parameters that can be optimized during training.

According to an embodiment of the present disclosure, an audio signal processing system for transforming an input audio signal, wherein the input audio signal includes a mixture of one or more target audio signals. The system including a memory including stored executable instructions and a stored module, such that the module transforms an input audio signal to obtain target audio signal estimates. A processor in communication with the memory. Wherein the processor implements steps of the module by inputting the input audio signal into a spectrogram estimator to extract an audio feature sequence, and process the audio feature sequence to output a set of estimated spectrograms. Wherein the set of estimated spectrograms includes an estimated spectrogram for each target audio signal. Processing the set of estimated spectrograms and the audio feature sequence using a spectrogram refinement module, to output a set of refined spectrograms, such that the set of refined spectrograms includes a refined spectrogram for each target audio signal. Wherein the processing of the spectrogram refinement module is based on an iterative reconstruction algorithm. Processing the set of refined spectrograms for the one or more target audio signals using a signal refinement module, to obtain the target audio signal estimates, such that there is a target audio signal estimate for each target audio signal. An output interface to output the optimized target audio signal estimates. Wherein the module is optimized by minimizing an error using an optimizer stored in the memory, such that the error includes one of an error on the set of estimated spectrograms, an error on the set of refined spectrograms, an error including a consistency measurement on the set of refined spectrograms, an error on the target audio signal estimates or some combination thereof.

According to another embodiment of the present disclosure, a method for transforming input audio signals, the method including defining a module for transforming an input audio signal, such that the input audio signal includes a mixture of one or more target audio signals. Wherein the module transforms the input audio signal, to obtain target audio signal estimates. A processor in communication with the memory, wherein the processor implements steps of the module by inputting the input audio signal into a spectrogram estimator of the model, to extract an audio feature sequence, and process the audio feature sequence to output a set of estimated spectrograms. Wherein the set of estimated spectrograms includes an estimated spectrogram for each target audio signal. Processing the set of estimated spectrograms and the audio feature sequence using a spectrogram refinement module of the model, to output a set of refined spectrograms. Such that the set of refined spectrograms includes a refined spectrogram for each target audio signal. Wherein the processing of the spectrogram refinement module is based on an iterative reconstruction algorithm. Processing the set of refined spectrograms for the one or more target audio signals using a signal refinement module of the model, to obtain the target audio signal estimates, such that there is a target audio signal estimate for each target audio signal. An output interface to output the optimized target audio signal estimates. Wherein the module is optimized by minimizing an error using an optimizer stored in a memory. Wherein the error includes one of an error on the set of estimated spectrograms, an error on the set of refined spectrograms, an error including a consistency measurement on the set of refined spectrograms, an error on the target audio signal estimates or some combination thereof. Wherein the steps are performed by a processor in communication with the memory having stored executable instructions, such that the module is stored in the memory.

According to another embodiment of the present disclosure, an audio signal processing system for transforming input audio signals. The system including a memory including stored executable instructions and a stored module. Such that the module transforms an input audio signal to obtain target audio signal estimates. Wherein input audio signal includes a mixture of one or more target audio signals. A processor in communication with the memory, wherein the processor implements steps of the module by receiving the input audio signal via an input interface in communication with the processor. Inputting the input audio signal into a spectrogram estimator to extract an audio feature sequence, and process the audio feature sequence to output a set of estimated spectrograms. Wherein the set of estimated spectrograms includes an estimated spectrogram for each target audio signal. Processing the set of estimated spectrograms and the audio feature sequence using a spectrogram refinement module, to output a set of refined spectrograms. Such that the set of refined spectrograms includes a refined spectrogram for each target audio signal. Wherein the processing of the spectrogram refinement module is based on an iterative reconstruction algorithm. Processing the set of refined spectrograms for the one or more target audio signals using a signal refinement module, to obtain the target audio signal estimates, such that there is a target audio signal estimate for each target audio signal. An output interface to output the optimized target audio signal estimates. Wherein the module is optimized by minimizing an error using an optimizer stored in the memory. Wherein the error includes one of an error on the set of estimated spectrograms, an error on the set of refined spectrograms, an error including a consistency measurement on the set of refined spectrograms, an error on the target audio signal estimates or some combination thereof.

According to another embodiment of the present disclosure, an audio signal processing system for transforming input audio signals. The system including a sound detecting device configured to acquire an input audio signal from an environment. A signal input interface device configured to receive and transmit the input audio signal, wherein the input audio signal includes a mixture of one or more target audio signals. An audio signal processing device configured to process the input audio signal. Wherein the audio signal processing device comprises: a hardware processor configured to connected to a memory. The memory configured to input/output data, wherein the hardware processor executes the steps of: accessing a module stored in the memory, such that the module transforms the input audio signal to obtain target audio signal estimates. Inputting the input audio signal into a spectrogram estimator of the module, to extract an audio feature sequence, and process the audio feature sequence to output a set of estimated spectrograms. Wherein the set of estimated spectrograms includes an estimated spectrogram for each target audio signal. Processing the set of estimated spectrograms and the audio feature sequence using a spectrogram refinement module of the module, to output a set of refined spectrograms. Such that the set of refined spectrograms includes a refined spectrogram for each target audio signal/Wherein the processing of the spectrogram refinement module is based on an iterative reconstruction algorithm. Processing the set of refined spectrograms for the one or more target audio signals using a signal refinement module of the module, to obtain the target audio signal estimates, such that there is a target audio signal estimate for each target audio signal. An output interface to output the optimized target audio signal estimates. Wherein the module is optimized by minimizing an error using an optimizer stored in the memory. Wherein the error includes one of an error on the set of estimated spectrograms, an error on the set of refined spectrograms, an error including a consistency measurement on the set of refined spectrograms, an error on the target audio signal estimates or some combination thereof.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

The present disclosure relates to audio signals, and more particularly to using an end-to-end approach for single-channel speaker-independent multi-speaker speech separation.

Figure 1A:
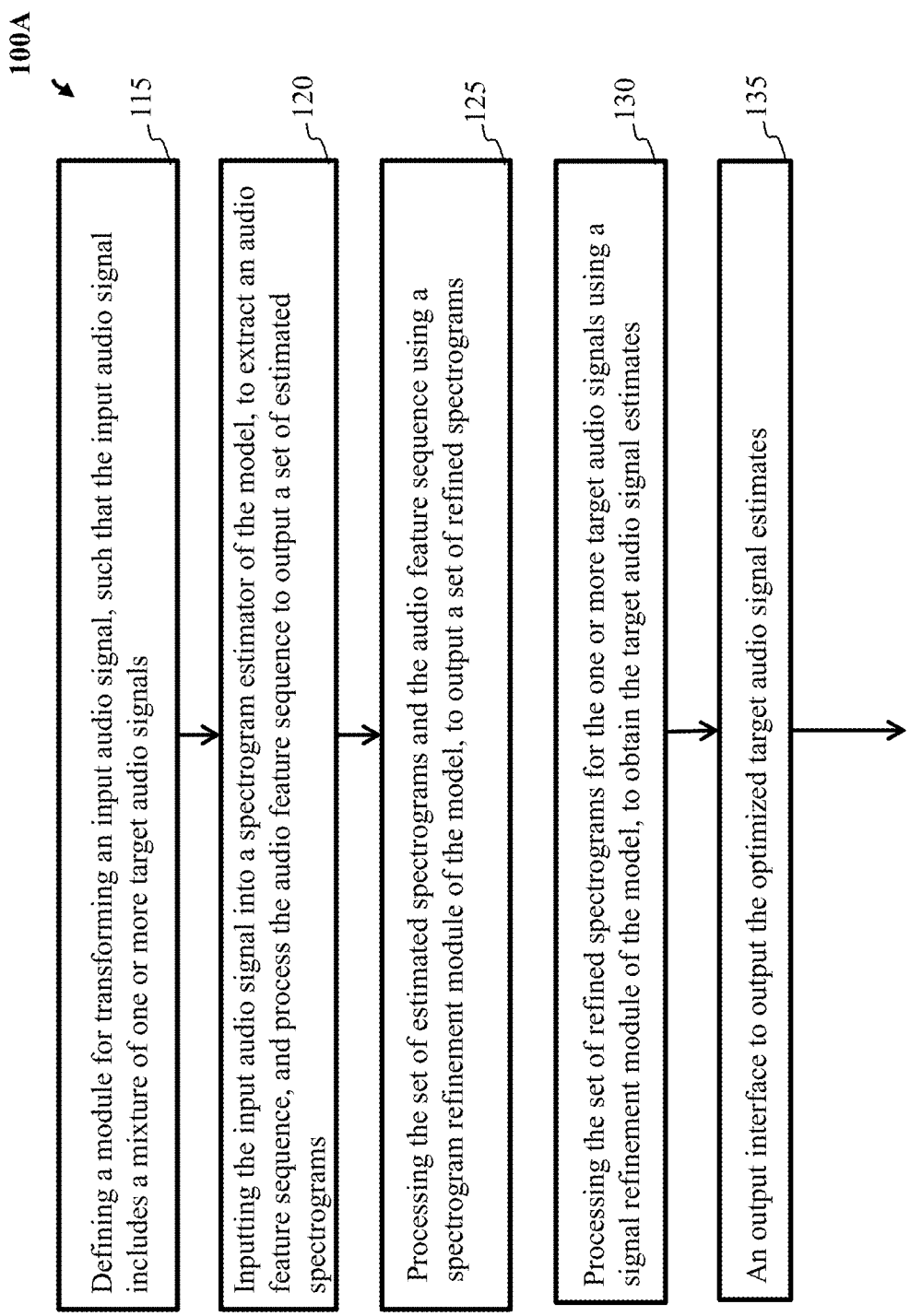
FIG. 1A is a flow diagram illustrating some method steps for implementing a method, according to embodiments of the present disclosure.

FIG. 1A is a flow diagram illustrating some method steps for implementing a method, according to embodiments of the present disclosure.

Step 115 of FIG. 1A includes defining a module for transforming an input audio signal, such that the input audio signal includes a mixture of one or more target audio signals, wherein the module transforms the input audio signal, to obtain target audio signal estimates.

Step 120 of FIG. 1A includes inputting the input audio signal into a spectrogram estimator of the model, to extract an audio feature sequence, and process the audio feature sequence to output a set of estimated spectrograms, wherein the set of estimated spectrograms includes an estimated spectrogram for each target audio signal.

Step 125 of FIG. 1A includes processing the set of estimated spectrograms and the audio feature sequence using a spectrogram refinement module of the model, to output a set of refined spectrograms, such that the set of refined spectrograms includes a refined spectrogram for each target audio signal, and wherein the processing of the spectrogram refinement module is based on an iterative reconstruction algorithm.

Step 130 of FIG. 1A includes processing the set of refined spectrograms for the one or more target audio signals using a signal refinement module of the model, to obtain the target audio signal estimates, such that there is a target audio signal estimate for each target audio signal.

Step 135 of FIG. 1A includes an output interface to output the optimized target audio signal estimates, wherein the module is optimized by minimizing an error using an optimizer stored in a memory, wherein the error includes one of an error on the set of estimated spectrograms, an error on the set of refined spectrograms, an error including a consistency measurement on the set of refined spectrograms, an error on the target audio signal estimates or some combination thereof. Wherein the steps are performed by a processor in communication with the memory having stored executable instructions, such that the module is stored in the memory.

Embodiments of the present disclosure provide unique aspects, by non-limiting example, is that the loss on the output signals can also include other errors, such as a speech recognition error. It is contemplated that the audio signal processing system can be trained together with a speech recognition system that takes as input the output of our system, so as to further improve recognizing speech amidst a cacophony of multiple speakers, among other things. In particular, recognizing speech amidst a cacophony of multiple speakers is a longstanding challenge, known as the cocktail party problem, noted above, within the technology space. Solving this cocktail party problem would enable dramatically better technology for real-world human machine interaction (HMI), among other things.

Figure 1B:
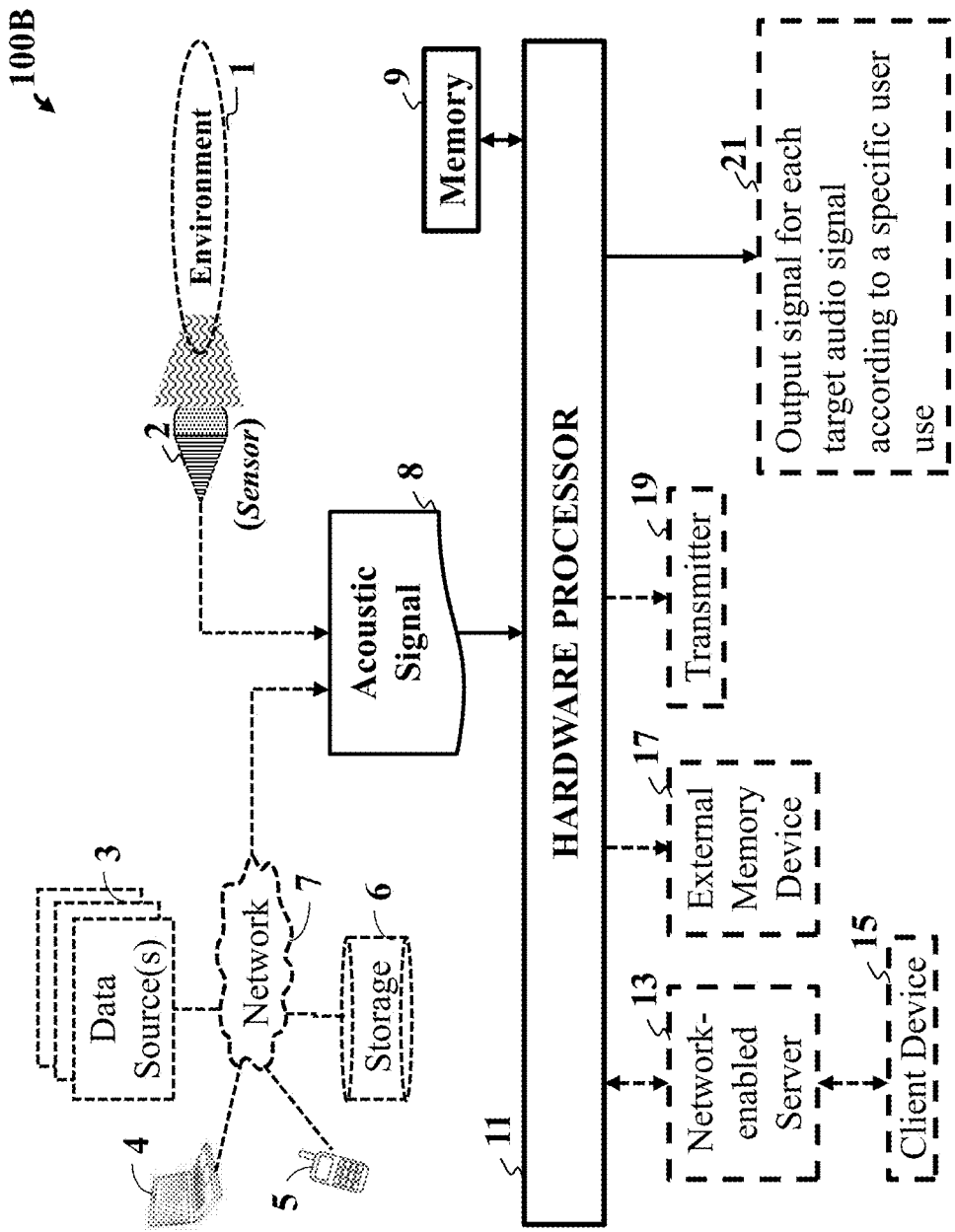
FIG. 1B is a block diagram illustrating some components that can be used for implementing the systems and methods, according to embodiments of the present disclosure.

FIG. 1B is a block diagram illustrating some components that can be used for implementing the systems and methods, according to embodiments of the present disclosure. For example, method 100B can include the hardware processor 11 in communication with a sensor 2 or sensors, such as an acoustic sensor, that collects data including an acoustic signal(s) 8 from an environment 1. The acoustic signal can include multiple speakers with overlapping speech. Further, the sensor 2 can convert an acoustic input into the acoustic signal The hardware processor 11 is in communication with a computer storage memory, i.e. memory 9, such that the memory 9 includes stored data, including algorithms, instructions and other data, that can be implemented by the hardware processor 11.

Optionally, the hardware processor 11 can be connected to a network 7, that is in communication with a data source(s) 3, computer device 4, a mobile phone device 5 and a storage device 6. Also optionally, the hardware processor 11 can be connected to a network-enabled server 13 connected to a client device 15. The hardware processor 11 can optionally be connected to an external memory device 17, a transmitter 19. Further, the text for each target speaker can be outputted according to a specific user intended use 21, for example, some types of user use can include displaying the text on one or more display device, such as a monitor or screen, or inputting the text for each target speaker into a computer related device for further analysis, etc.

It is contemplated the hardware processor 11 can include two or more hardware processors depending upon the requirements of the specific application, wherein the processors can be either internal or external. Certainly, other components may be incorporated with method 100B including output interfaces and transceivers, among other devices.

It is possible the network 7 can include, by non-limiting example, one or more local area networks (LANs) and/or wide area networks (WANs). Wherein the networking environments can be similar to enterprise-wide computer networks, intranets and the Internet. Contemplated for all the components mentioned that there can be any number of client devices, storage components, and data sources employed within the system 100B. Each may comprise a single device or multiple devices cooperating in a distributed environment. Further, system 100B can include one or more data source(s) 3. Data source(s) 3 may comprise data resources for training a speech separation network. For example, in an embodiment, the training data can include acoustic signals of multiple speakers talking simultaneously. The training data can also include acoustic signals of single speakers talking alone, acoustic signals of single or multiple speakers talking in a noisy environment, and acoustic signals of noisy environments. Data source(s) 3 may also comprise data resources for training a speech recognition network. The data provided by data source(s) 3 may include labeled and un-labeled data, such as transcribed and un-transcribed data. For example, in an embodiment, the data includes one or more sounds and may also include corresponding transcription information or labels that may be used for initializing a speech recognition network.

Further, un-labeled data in data source(s) 3 can be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or captured images (e.g., depth camera images), tweets, chat or video-call records, or social-networking media. Specific data source(s) 3 used may be determined based on the application including whether the data is a certain class of data (e.g., data only related to specific types of sounds, including machine systems, entertainment systems, for example) or general (non-class-specific) in nature.

System 100B can include third party devices 4, 5, which can comprise of any type of computing device, such that there may be interest to have an automatic speech recognition (ASR) system on the computing device. For example, the third party devices including a computer device 4 such as the type of computing device described in relation to FIG. 18A, or a mobile device 5, such as the type of mobile computing device described in relation to FIG. 18B, herein. Contemplated is that a user device may be embodied as a personal data assistant (PDA), a mobile device, such as a smartphone, smart watch, smart glasses (or other wearable smart device), augmented reality headset, virtual reality headset. Further, the user device could be a laptop, such as a tablet, remote control, entertainment system, vehicle computer system, embedded system controller, appliance, home computer system, security system, consumer electronic device, or other similar electronics device. In one embodiment, the client device is capable of receiving input data such as audio and image information usable by an ASR system described herein that is operating on the device. For example, the third party device may have a microphone or line-in for receiving audio information, a camera for receiving video or image information, or a communication component (e.g., Wi-Fi functionality) for receiving such information from another source, such as the Internet or a data source 3.

The ASR model using a speech recognition network can process the inputted data to determine computer-usable information. For example, a query spoken by a user into a microphone while multiple people in the room are talking may be processed to determine the content of the query, for example, if a question is asked. Example third party devices 4, 5 are optionally included in system 100B to illustrate an environment that the deep neural network model may be deployed. Further, some embodiments of the present disclosure may not include third party devices 4, 5. For example, a deep neural network model can be on a server or in a cloud network, system or like arrangement.

Regarding the storage 6, the storage 6 can store information including data, computer instructions (e.g., software program instructions, routines, or services), and/or models used in embodiments of the technology described herein. For example, the storage 6 can store data from one or more data source(s) 3, one or more deep neural network models, information for generating and training deep neural network models, and the computer-usable information outputted by one or more deep neural network models.

Figure 1C:
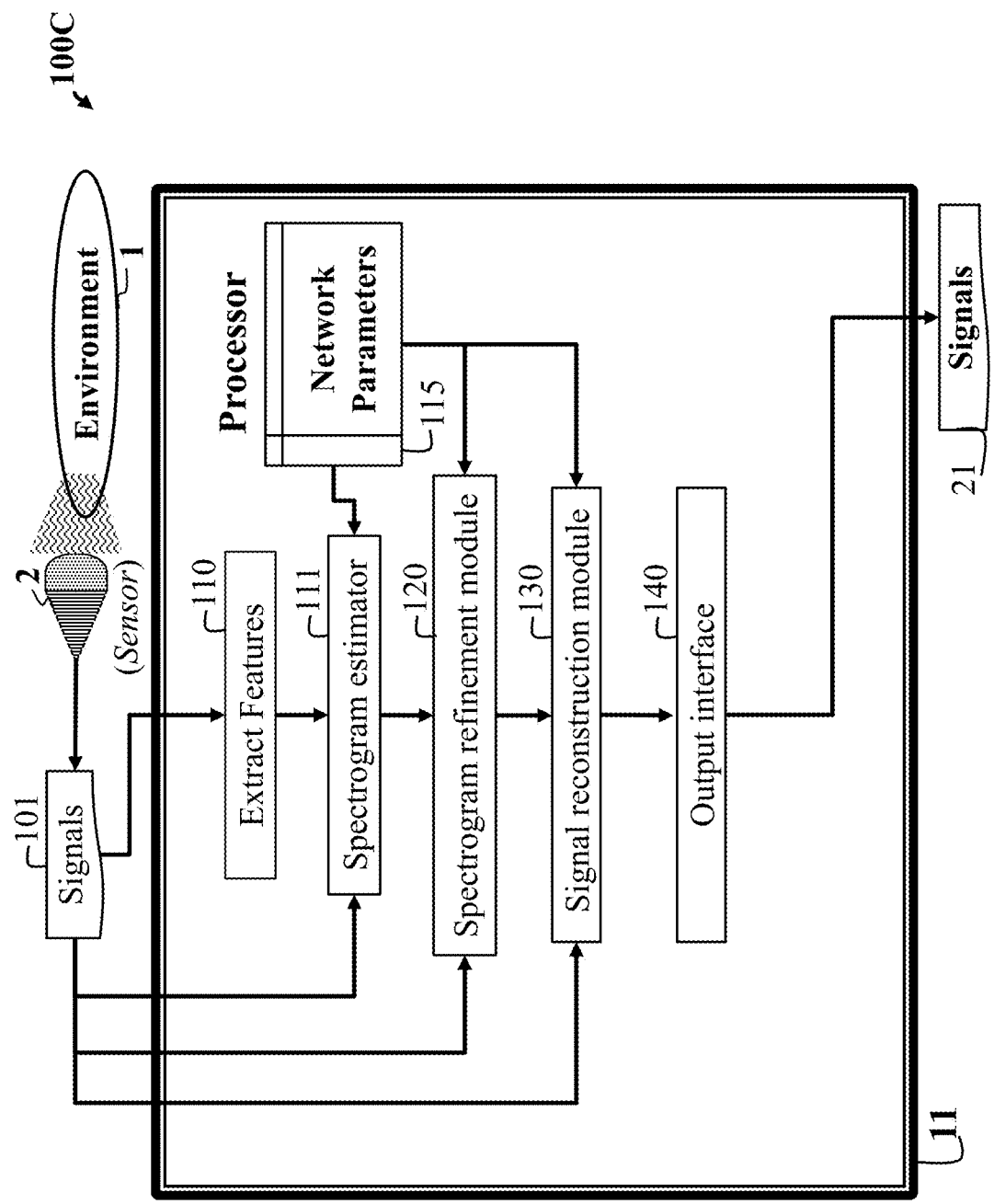
FIG. 1C is a block diagram illustrating an audio signal processing system for estimating target audio signals from an input audio signal including a mixture of multiple target audio signals, according to embodiments of the present disclosure.

FIG. 1C is a block diagram illustrating an audio signal processing system 100C for estimating target audio signals from an input audio signal 101 obtained from a sensor 2 monitoring an environment 1. The input audio signal including a mixture of multiple target audio signals, according to embodiments of the present disclosure. The audio signal processing system processes the signals via processor 11 by using a feature extraction module 110 to compute an audio feature sequence, which is processed by the spectrogram estimator 111 to output a set of spectrogram estimates. The set of spectrogram estimates is processed by a spectrogram refinement module 120 to output a set of refined spectrograms, which is further processed by a signal reconstruction module 130 to compute target audio signal estimates. Network parameters 115 can be inputted into the spectrogram estimator 111, the spectrogram refinement module 120 and the signal reconstruction module 130. An output interface 140 then outputs the target audio signal estimates 21.

Figure 2A:
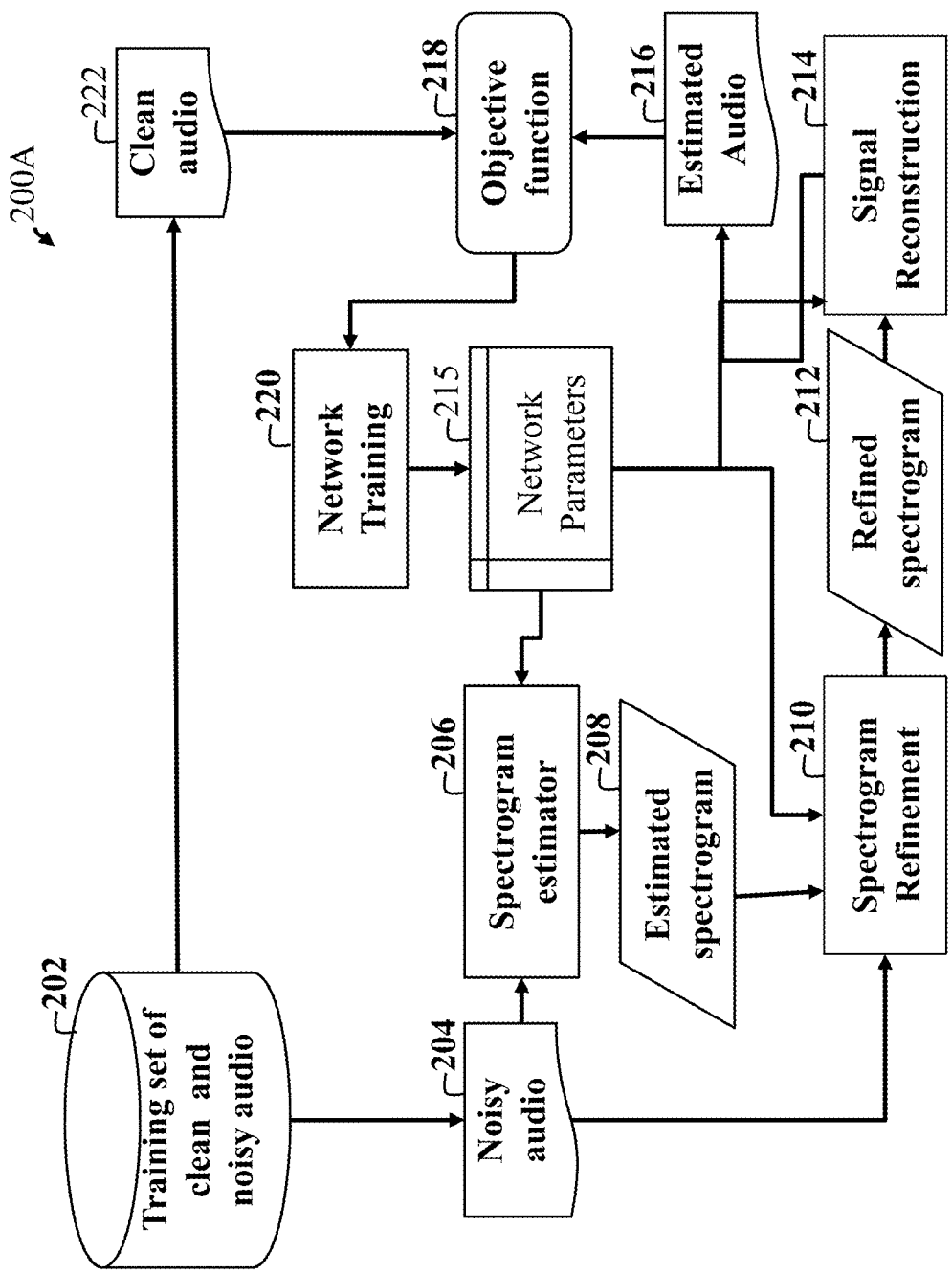
FIG. 2A is a flow diagram illustrating training of an end-to-end audio signal processing system for speech enhancement, according to embodiments of the present disclosure.

FIG. 2A is a flow diagram illustrating training of an end-to-end audio signal processing system 200A for speech enhancement, according to embodiments of the present disclosure. The system illustrates using as example a case of speech enhancement, that is the separation of speech from noise within a noisy signal, but the same considerations apply to more general cases such as source separation, in which the system estimates multiple target audio signals from a mixture of target audio signals and potentially other non-target sources such as noise. A noisy input signal 204 including a mixture of speech and noise and the corresponding clean signals for the speech and noise are sampled from the training set of clean and noisy audio 202. The noisy input signal 204 is processed by a spectrogram estimator 206 to compute estimated spectrograms 208 for the speech and the noise, using stored network parameters 215. The estimated spectrograms are further processed by a spectrogram refinement module 210 to output a refined spectrogram 212 for the speech, using stored network parameters 215. A signal reconstruction module 214 inverts the refined spectrogram 212 for the speech to obtain estimated audio 216 for the speech. An objective function computation module 218 computes an objective function by computing a distance between the clean speech and the estimated audio for the speech. Alternatively, refined spectrograms for both speech and noise could have been obtained from the spectrogram refinement module 210, and inverted by the signal reconstruction module 214 to lead to estimated audio signals 216 for both speech and noise, that could both be used, together with the clean speech and noise signals 222, to compute an objective function. The objective function can be used by a network training module 220 to update the network parameters 215.

Figure 2B:
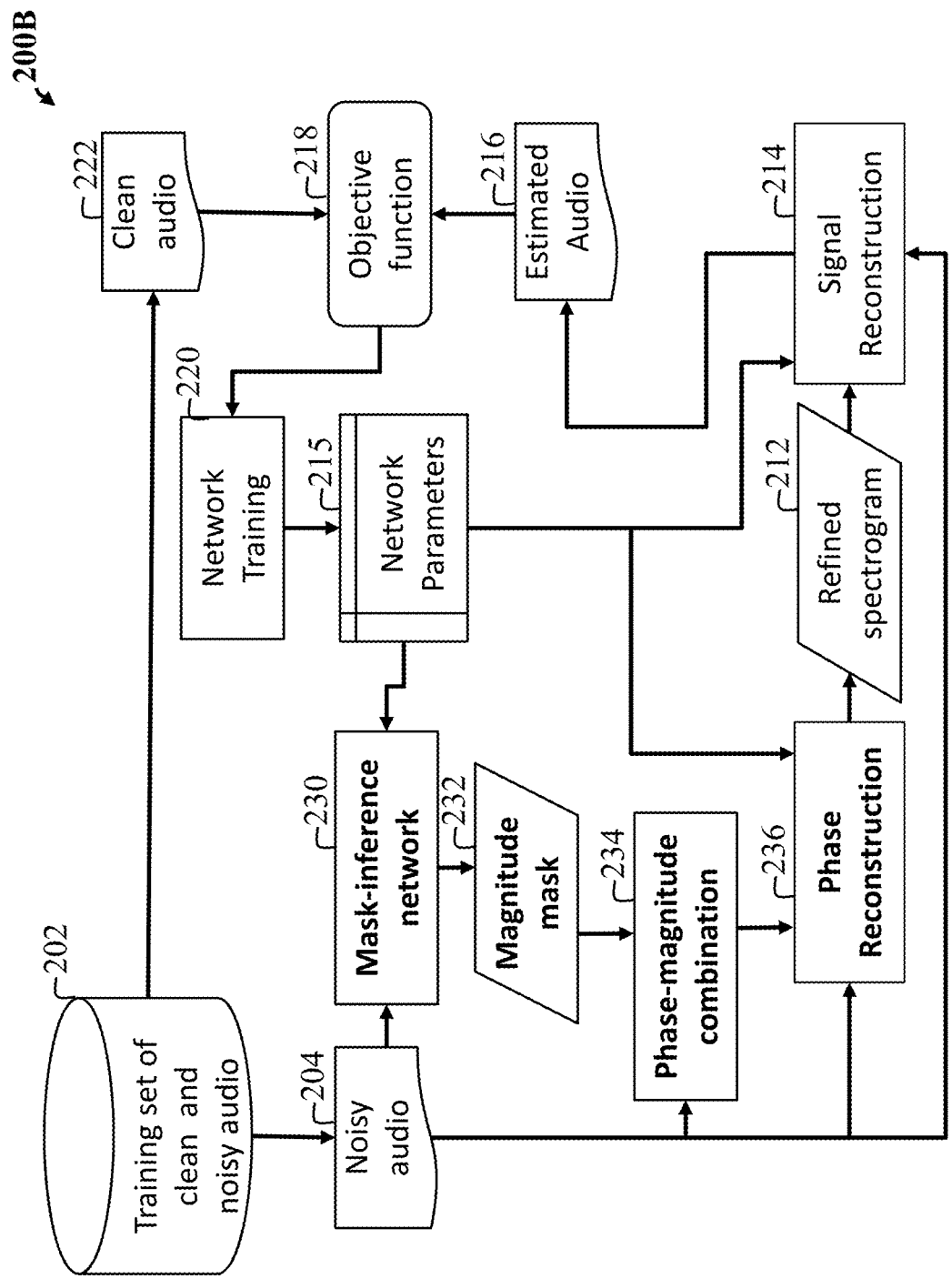
FIG. 2B is a flow diagram illustrating training of an end-to-end audio signal processing system for speech enhancement based on mask inference, according to embodiments of the present disclosure.

FIG. 2B is a flow diagram illustrating training of an end-to-end audio signal processing system 200B for speech enhancement based on mask inference, according to embodiments of the present disclosure; The setup is similar to FIG. 2A, where the spectrogram estimation module 206 of FIG. 2A is here based on a mask-inference network 230 which estimates a set of masks, a magnitude reconstruction module 232 that multiplies the masks with a magnitude time-frequency representation of the noisy audio to obtain a set of estimated magnitudes, and a phase-magnitude combination module 234, which combines the estimated magnitudes with the phase of the noisy audio to obtain a set of estimated spectrograms, in the complex time-frequency domain. The estimated spectrograms are then processed by a phase reconstruction algorithm to obtain a set of refined spectrograms. The phase reconstruction module 236 is built by implementing steps of an iterative phase reconstruction algorithm as layers of a neural network, converting parameters of the iterative phase reconstruction algorithm into freely varying parameters of the network. The rest of the processing and the procedure to train the system is similar to that of FIG. 2A.

Figure 3A:
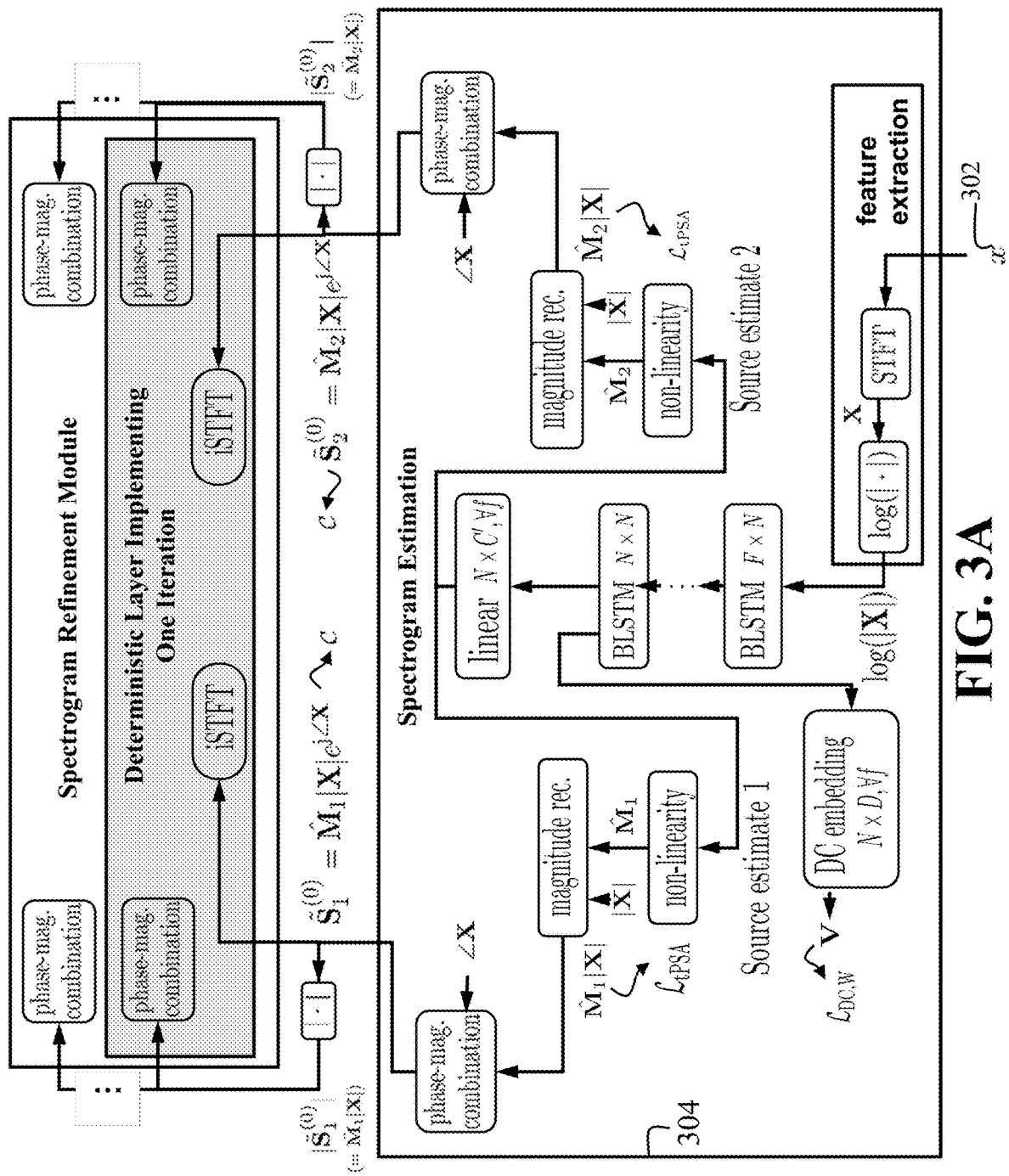
FIG. 3A and FIG. 3B are flow diagrams illustrating an end-to-end audio signal processing system for source separation, with a spectrogram refinement module including multiple steps of a deterministic spectrogram inversion algorithm, according to embodiments of the present disclosure.
Figure 3B:
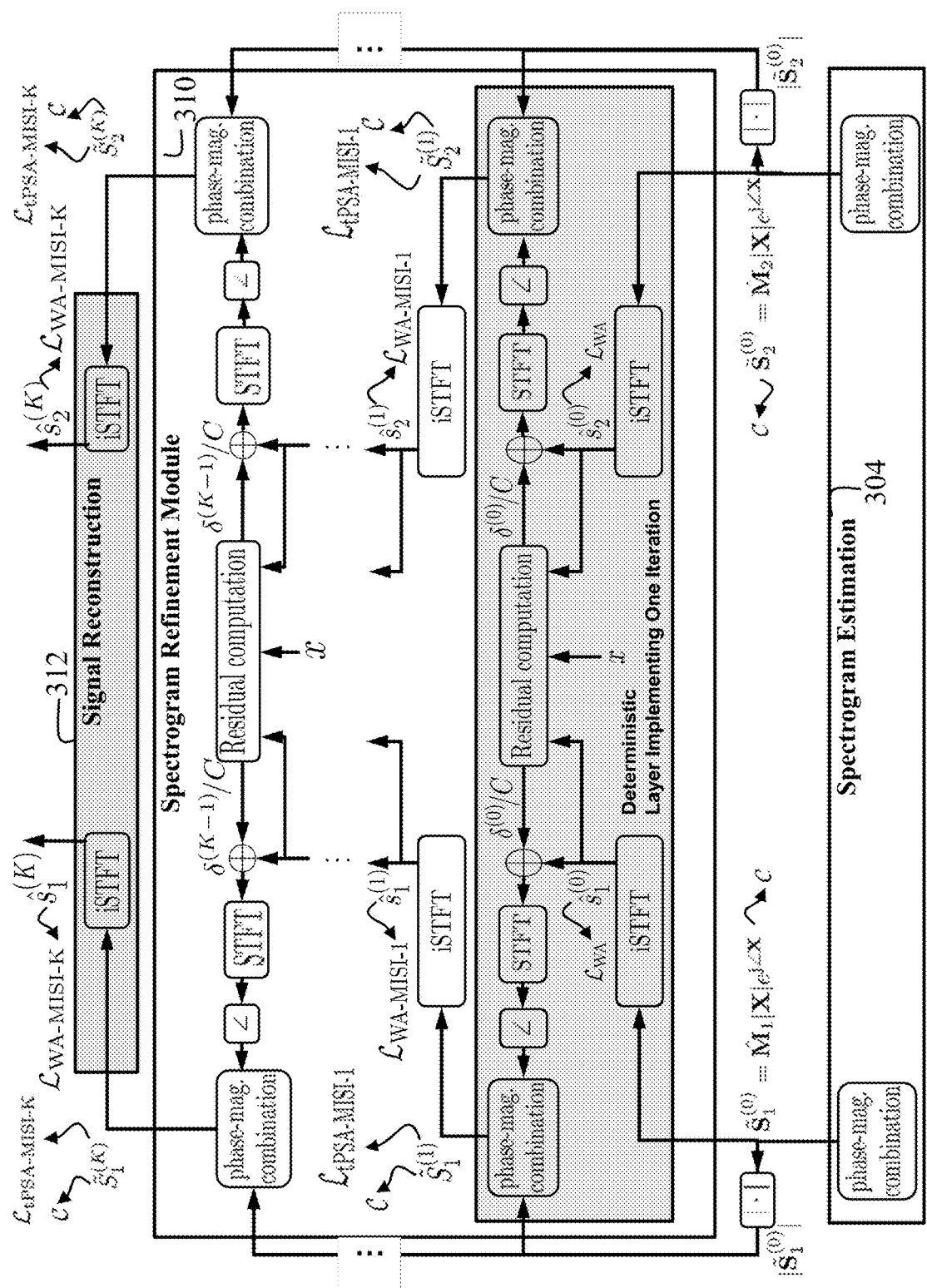

FIG. 3A and FIG. 3B are flow diagrams illustrating an end-to-end audio signal processing system for source separation, with a spectrogram refinement module including multiple steps of a deterministic spectrogram inversion algorithm, according to embodiments of the present disclosure. For illustration purposes, we assume here that there are two target sources, but the algorithm can be similarly used for any number of sources. An input mixture X 302 is processed by a spectrogram estimation module 304 to output a set of spectrogram estimates, one for each source. The spectrogram estimation module 304 processes the input mixture 302 using a feature extraction module to compute an audio feature sequence, extracting the log magnitude of the STFT of the input. This audio feature sequence is processed by several stacked BLSTM layers. The estimated spectrograms are here obtained by a mask-inference method. For each target source, a linear layer, followed by a non-linearity such as a sigmoid, is used to compute a mask for each time-frequency unit. Each mask is multiplied, in a magnitude reconstruction module, with the magnitude of the STFT of the mixture to obtain an estimated magnitude spectrogram for each source. This estimated magnitude spectrogram is combined with the phase component of the STFT of the mixture to obtain an estimated spectrogram in the complex domain for each source. In some embodiments, some deep clustering embeddings can be computed by part of the network to compute a deep clustering objective function, or to estimate masks from the embeddings and use them for spectrogram estimation, or both. The estimated spectrograms are processed by a spectrogram refinement module 310 to output refined spectrograms. The spectrogram refinement module 310 implements multiple iterations of an iterative phase reconstruction algorithm, here the multiple input spectrogram inversion (MIST) algorithm, as layers of a deep neural network. Each iteration takes a set of spectrograms as input, inverts them in the time-domain using iSTFT to obtain inverted signals, computes the error between the input mixture and the sum of the inverted signals, distributes this error, here evenly, back to each inverted signal to obtain error-compensated inverted signals, computes the STFT of error-compensated inverted signals, extract their phase, and combine it with the magnitude of the magnitude of the estimated spectrograms to obtain the input to the next iteration. The outputs of the final iteration are the refined spectrograms. The refined spectrograms are processed by a signal reconstruction module 312, which performs iSTFT of each refined spectrogram, to obtain the target audio signals. Error functions can be considered on the deep clustering embeddings, the estimated masks, the estimated magnitude spectrograms, the estimated complex spectrograms, the spectrograms obtained at the output of one or more of the iterations of the spectrogram refinement module 310, the inverted signals obtained within one or more iterations of the spectrogram refinement module, the refined spectrograms, or the target audio signals.

Figure 4:
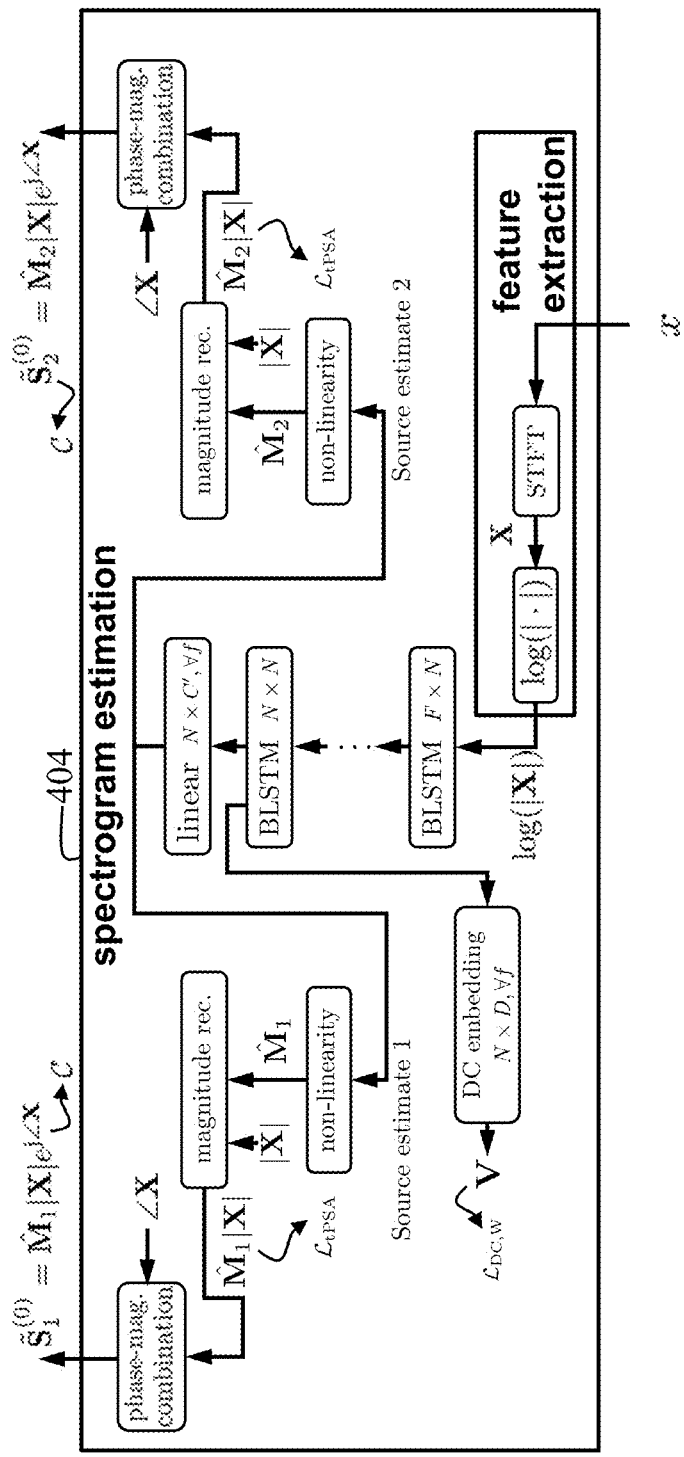
FIG. 4 is a flow diagram illustrating a spectrogram estimation module of an end-to-end audio signal processing system for source separation, according to embodiments of the present disclosure.

FIG. 4 is a flow diagram illustrating a spectrogram estimation module 410 of an end-to-end audio signal processing system for source separation, according to embodiments of the present disclosure.

Figure 5:
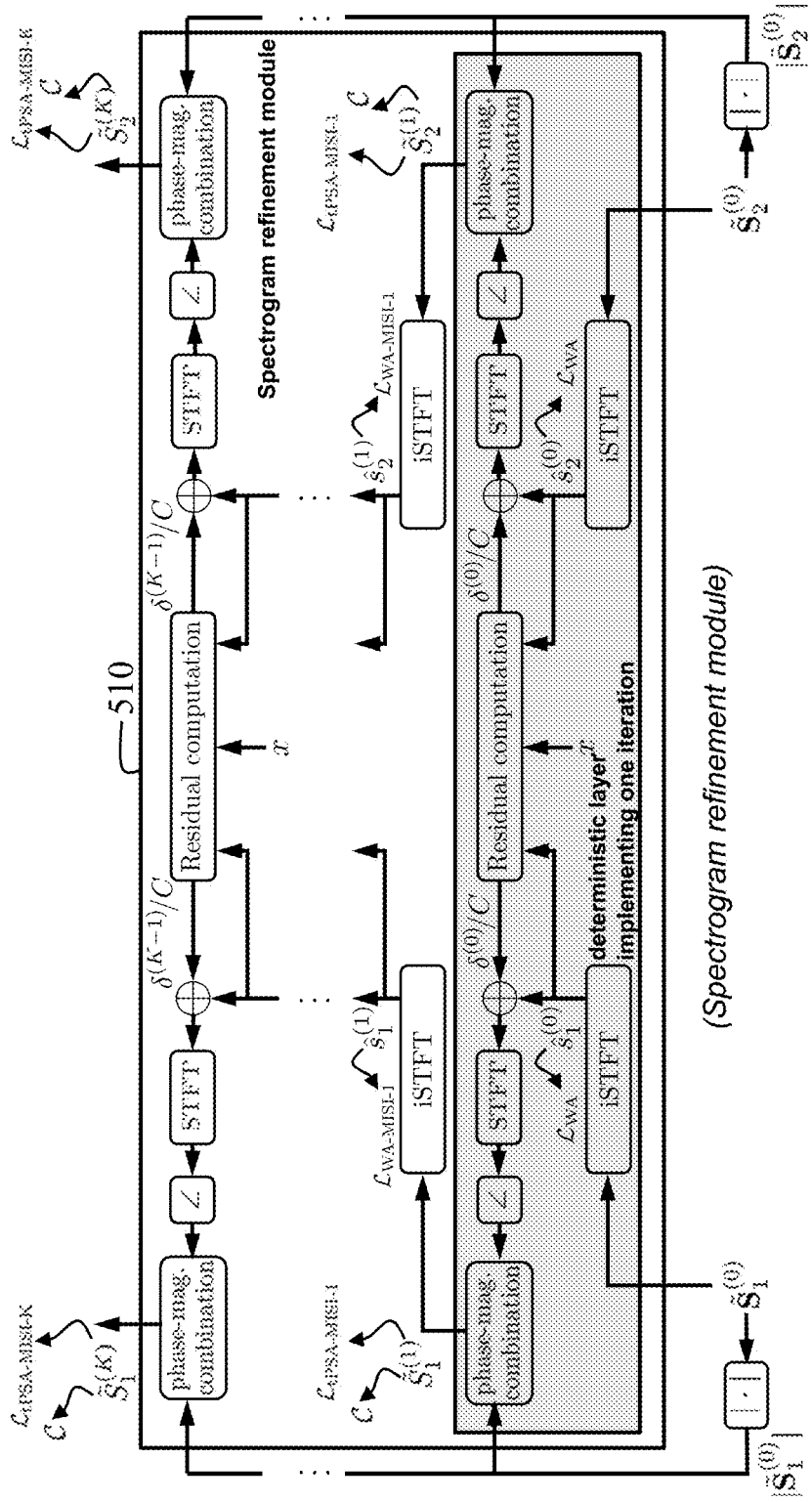
FIG. 5 is a flow diagram illustrating a spectrogram refinement module of an end-to-end audio signal processing system for source separation, wherein the spectrogram refinement module includes multiple steps of a deterministic spectrogram inversion algorithm, according to embodiments of the present disclosure.

FIG. 5 is a flow diagram illustrating a spectrogram refinement module 510 of an end-to-end audio signal processing system for source separation, wherein the spectrogram refinement module 510 includes multiple steps of a deterministic spectrogram inversion algorithm, according to embodiments of the present disclosure.

Figure 6:
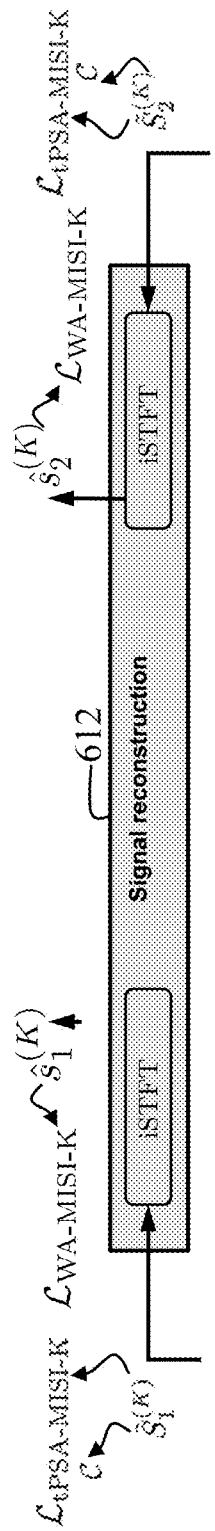
FIG. 6 is a flow diagram illustrating a signal reconstruction module of an end-to-end audio signal processing system for source separation, according to embodiments of the present disclosure.

FIG. 6 is a flow diagram illustrating a signal reconstruction module 612 of an end-to-end audio signal processing system for source separation, according to embodiments of the present disclosure.

Figure 7A:
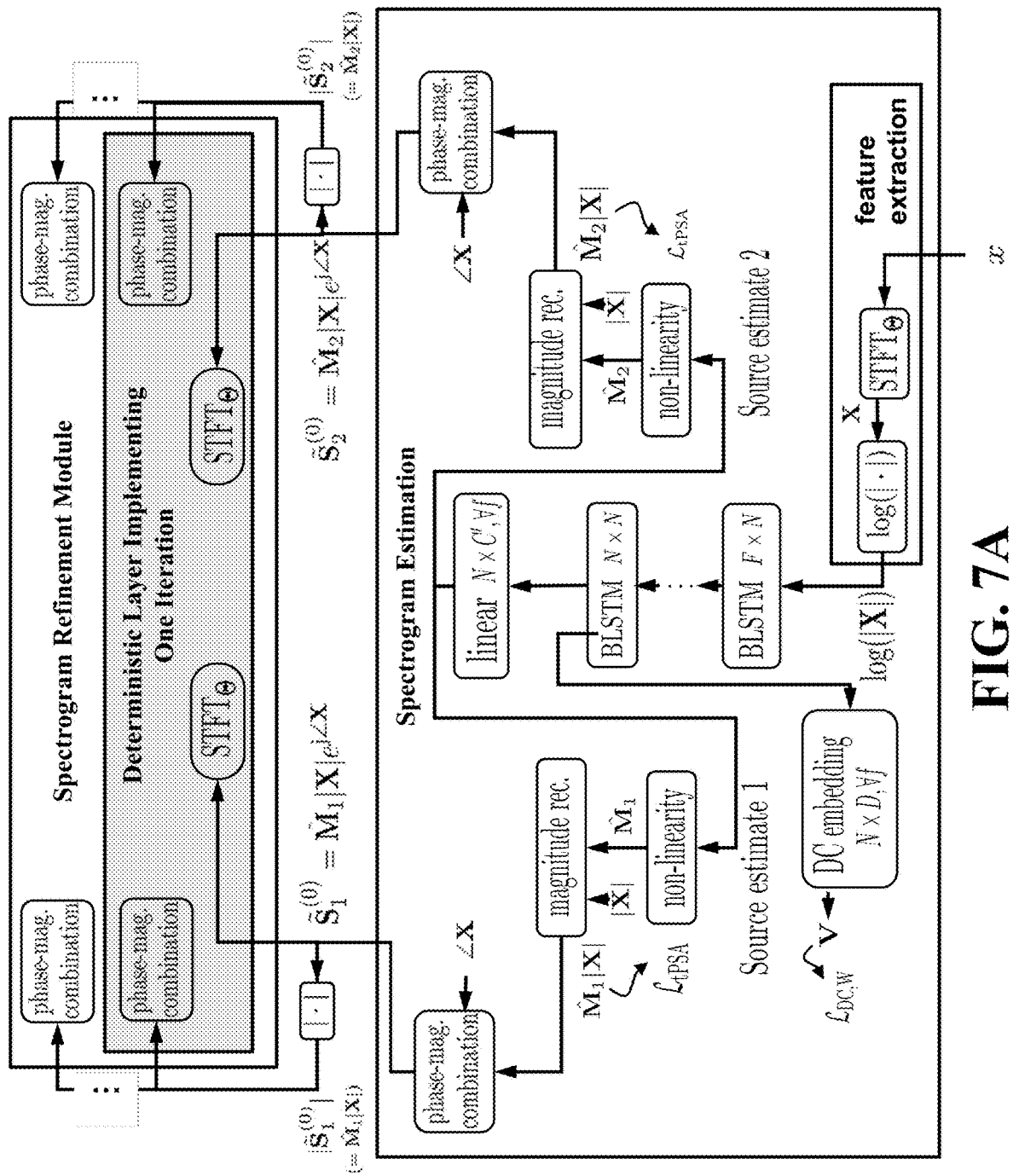
FIG. 7A and FIG. 7B are flow diagrams illustrating an end-to-end audio signal processing system for source separation, with a spectrogram refinement module including multiple layers obtained by unfolding multiple iterations of a spectrogram inversion algorithm and converting fixed parameters of the iterations of the spectrogram inversion algorithm into trainable parameters, according to embodiments of the present disclosure.
Figure 7B:
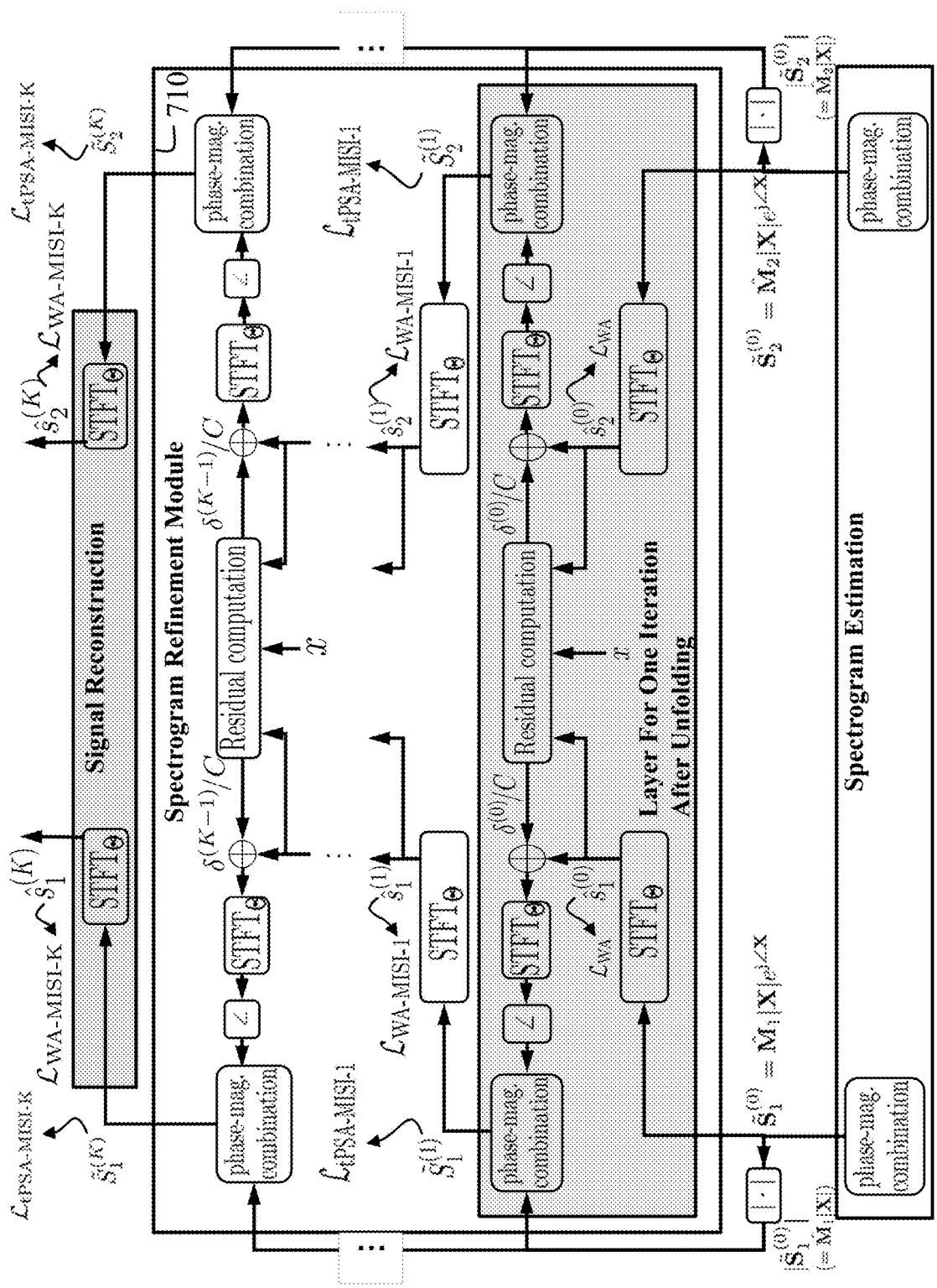

FIG. 7A and FIG. 7B are flow diagrams illustrating an end-to-end audio signal processing system for source separation, with a spectrogram refinement module 710 including multiple layers obtained by unfolding multiple iterations of a spectrogram inversion algorithm and converting fixed parameters of the iterations of the spectrogram inversion algorithm into trainable parameters, according to embodiments of the present disclosure.

It is noted that in FIG. 7A and FIG. 7B, the deterministic STFT and iSTFT layers can be replaced with trainable layers, wherein parameters of the STFT and iSTFT (e.g., the DFT matrix) can vary and be trained. Further, in FIG. 7A and FIG. 7B the symbol Θ is the set of ALL parameters for all parts of the network, and each layer can use a (potentially different) subset of these parameters.

Figure 8:
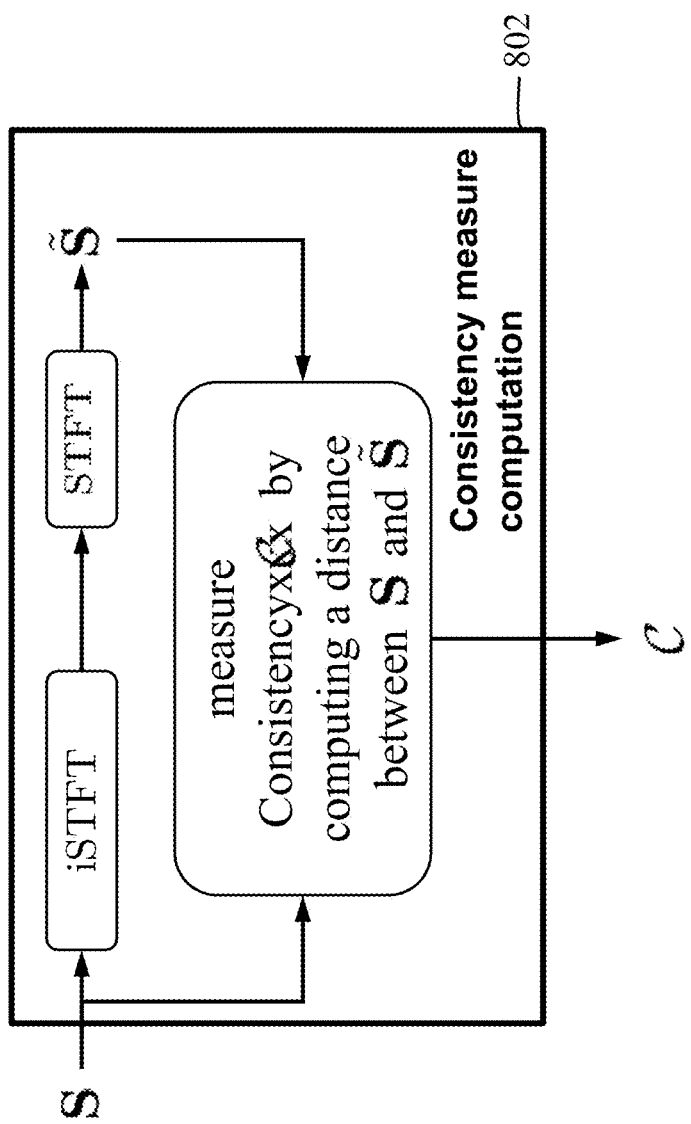
FIG. 8 is a flow diagram illustrating computation of a consistency measure on a complex spectrogram, according to embodiments of the present disclosure.

FIG. 8 is a flow diagram illustrating computation of a consistency measure on a complex spectrogram, according to embodiments of the present disclosure. A consistency measure computation module 802 processes an input spectrogram to compute a consistency measure with respect to a time-frequency domain. The time-frequency domain is specified by a forward transform which converts time-domain signals into a time-frequency representation. An inverse transform that can convert the time-frequency representation of a signal back to the signal is considered. That inverse transform can also be applied to modified time-frequency representations that may not correspond to the time-frequency representation of any signal. Such representations are called inconsistent, while those that are obtained from a time-domain signal are called consistent. For example, if the time-frequency representation of interest is the short-time Fourier transform, the inverse transform can be implemented as the inverse short-time Fourier transform. This figure uses the STFT and iSTFT for illustration purposes. The consistency measure computation module 802 processes the input spectrogram using the inverse short-time Fourier transform to obtain an inverted signal, then computes the short-time Fourier transform of the inverted signal to obtain its spectrogram. The consistency measure is defined as a distance between the input spectrogram and the spectrogram of the inverted signal.

Figure 9A:
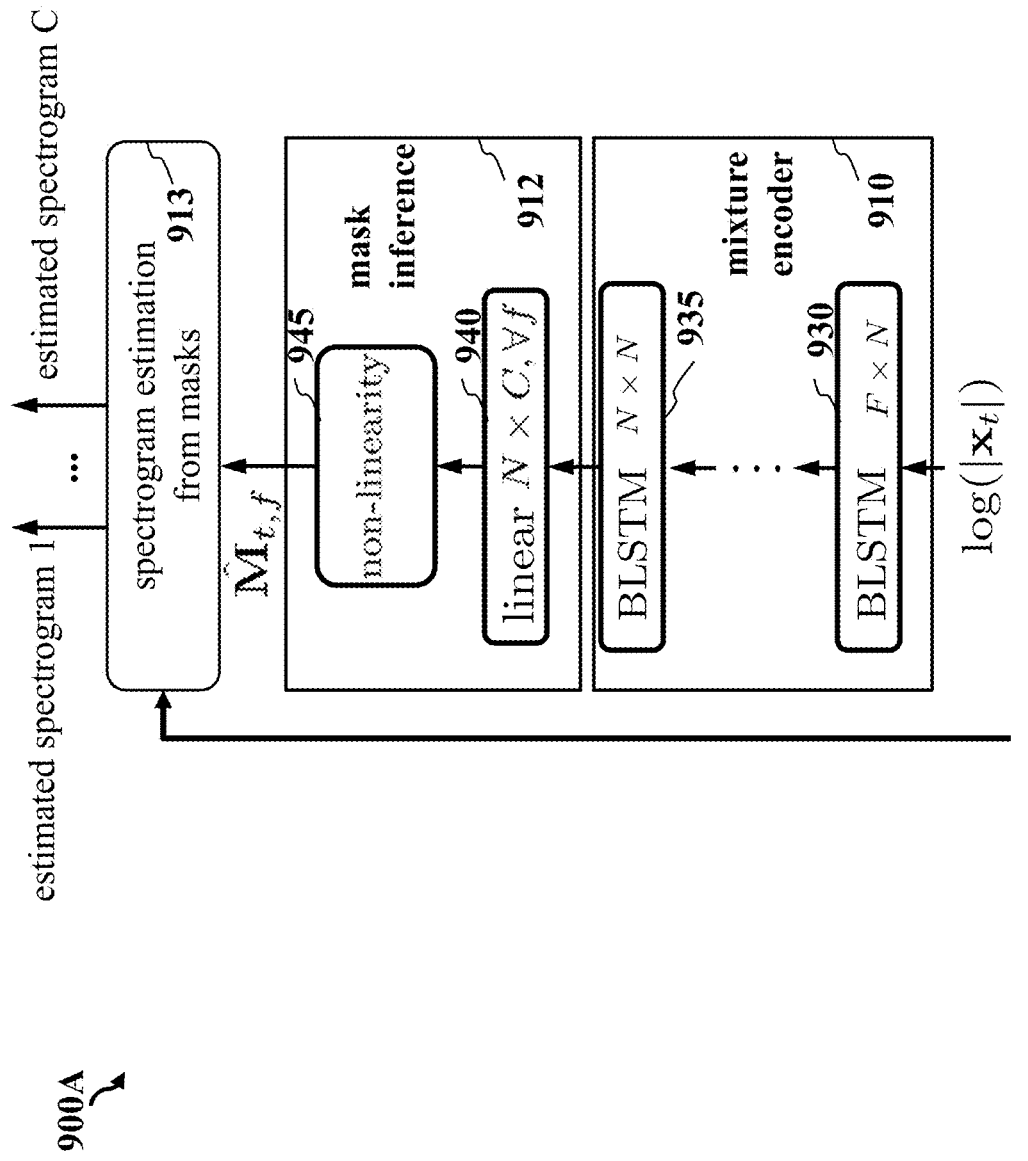
FIG. 9A is a block diagram illustrating a single-channel mask inference network architecture, according to embodiments of the present disclosure.

FIG. 9A is a block diagram illustrating a single-channel mask inference network architecture 900A, according to embodiments of the present disclosure. A sequence of feature vectors obtained from the input mixture, for example the log magnitude of the short-time Fourier transform of the input mixture, is used as input to a mixture encoder 910. For example, the dimension of the input vector in the sequence can be F. The mixture encoder 910 is composed of multiple bidirectional long short-term memory (BLSTM) neural network layers, from the first BLSTM layer 930 to the last BLSTM layer 935. Each BLSTM layer is composed of a forward long short-term memory (LSTM) layer and a backward LSTM layer, whose outputs are combined and use as input by the next layer. For example, the dimension of the output of each LSTM in the first BLSTM layer 930 can be N, and both the input and output dimensions of each LSTM in all other BLSTM layers including the last BLSTM layer 935 can be N. The output of the last BLSTM layer 935 is used as input to a mask inference module 912, including a linear neural network layer 940 and a non-linearity 945. For each time frame and each frequency in a time-frequency domain, for example the short-time Fourier transform domain, the linear layer 940 uses output of the last BLSTM layer 935 to output C numbers, where C is the number of target speakers. The non-linearity 945 is applied to this set of C numbers for each time frame and each frequency, leading to mask values which indicate, for each time frame, each frequency, and each target speaker, the dominance of that target speaker in the input mixture at that time frame and that frequency. A separation encoding estimation from masks module 913 uses these masks, together with a representation of the input mixture in the time-frequency domain for which the masks were estimated, for example the magnitude short-time Fourier transform domain, to output separation encodings for each target speaker. For example, the separation encoding estimation from masks module 913 can multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

Figure 9B:
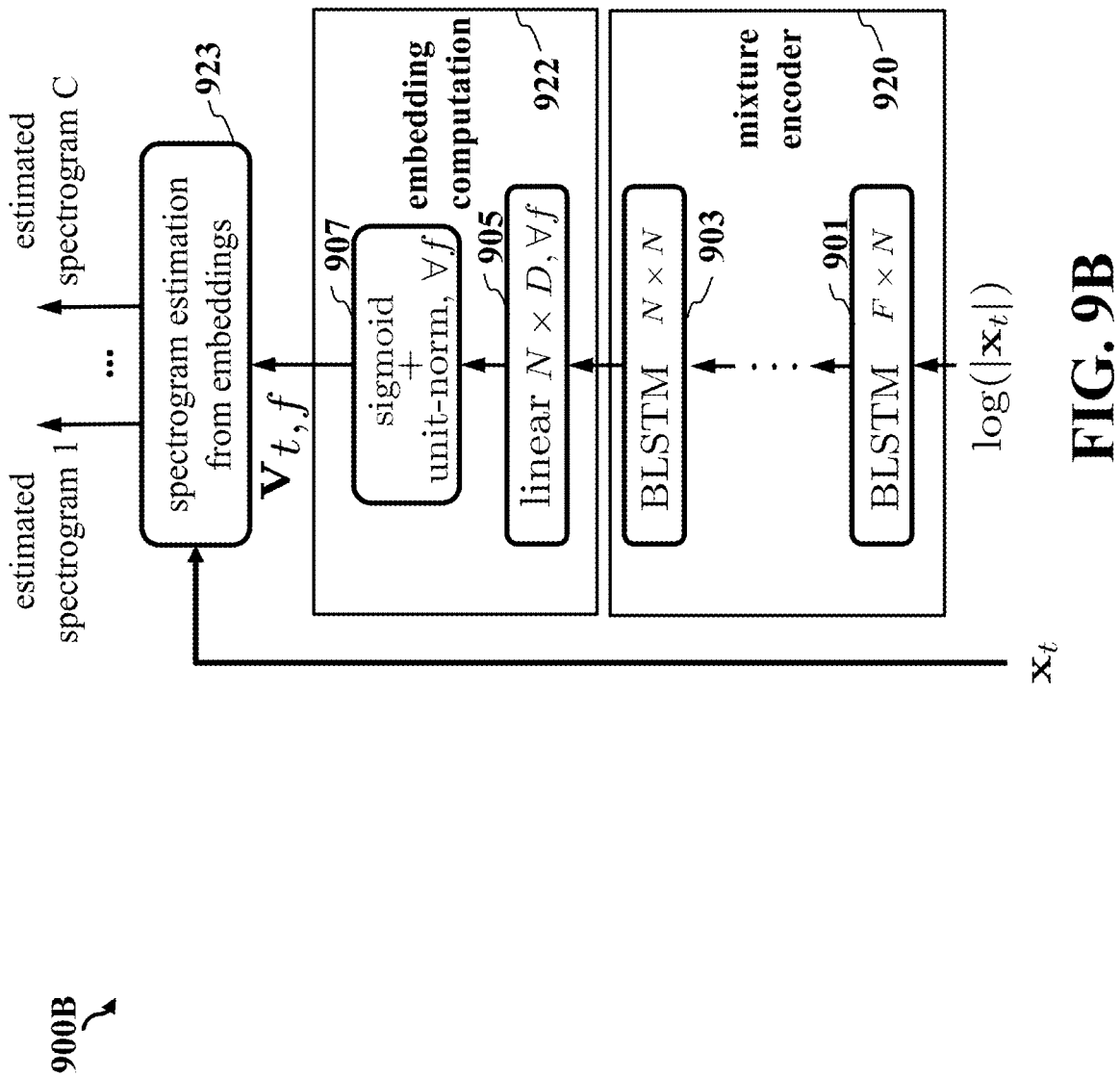
FIG. 9B is a block diagram illustrating a single-channel deep clustering network architecture, according to embodiments of the present disclosure.

FIG. 9B is a block diagram illustrating a single-channel deep clustering network architecture 900B, according to embodiments of the present disclosure. A sequence of feature vectors obtained from the input mixture, for example the log magnitude of the short-time Fourier transform of the input mixture, is used as input to a mixture encoder 920. For example, the dimension of the input vector in the sequence can be F. The mixture encoder 920 is composed of multiple bidirectional long short-term memory (BLSTM) neural network layers, from the first BLSTM layer 901 to the last BLSTM layer 903. Each BLSTM layer is composed of a forward long short-term memory (LSTM) layer and a backward LSTM layer, whose outputs are combined and use as input by the next layer. For example, the dimension of the output of each LSTM in the first BLSTM layer 901 can be N, and both the input and output dimensions of each LSTM in all other BLSTM layers including the last BLSTM layer 903 can be N. The output of the last BLSTM layer 903 is used as input to an embedding computation module 922, including a linear neural network layer 905 and a module implementing a sigmoid non-linearity followed by a unit-norm normalization 907. For each time frame and each frequency in a time-frequency domain, for example the short-time Fourier transform domain, the linear layer 905 uses output of the last BLSTM layer 903 to output a D-dimensional vector, where D is an embedding dimension. The module implementing a sigmoid non-linearity followed by a unit-norm normalization 907 applies a sigmoid to each element of the D-dimension vector, and renormalizes it so that it has unit Euclidean norm, leading to an embedding vector for each time frame and frequency. A separation encoding estimation from embeddings module 923 uses these embedding vectors, together with a representation of the input mixture in the time-frequency domain for which the embeddings were estimated, for example the magnitude short-time Fourier transform domain, to output separation encodings for each target speaker. For example, the separation encoding estimation from embeddings module 923 can use a clustering algorithm such as the k-means algorithm to cluster the embedding vectors into C groups, where C is the number of target speakers, and each group corresponds to time and frequency components that are dominated by a same speaker. A binary mask can be obtained for each speaker, indicating whether a time and frequency component is dominated by that speaker or not. The separation encoding estimation from embeddings module 923 can then multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker. More elaborate schemes to obtain such masks using a separation encoding estimation from embeddings module 923 can also be considered, and the descriptions above shall not be considered limiting in any way.

Figure 9C:
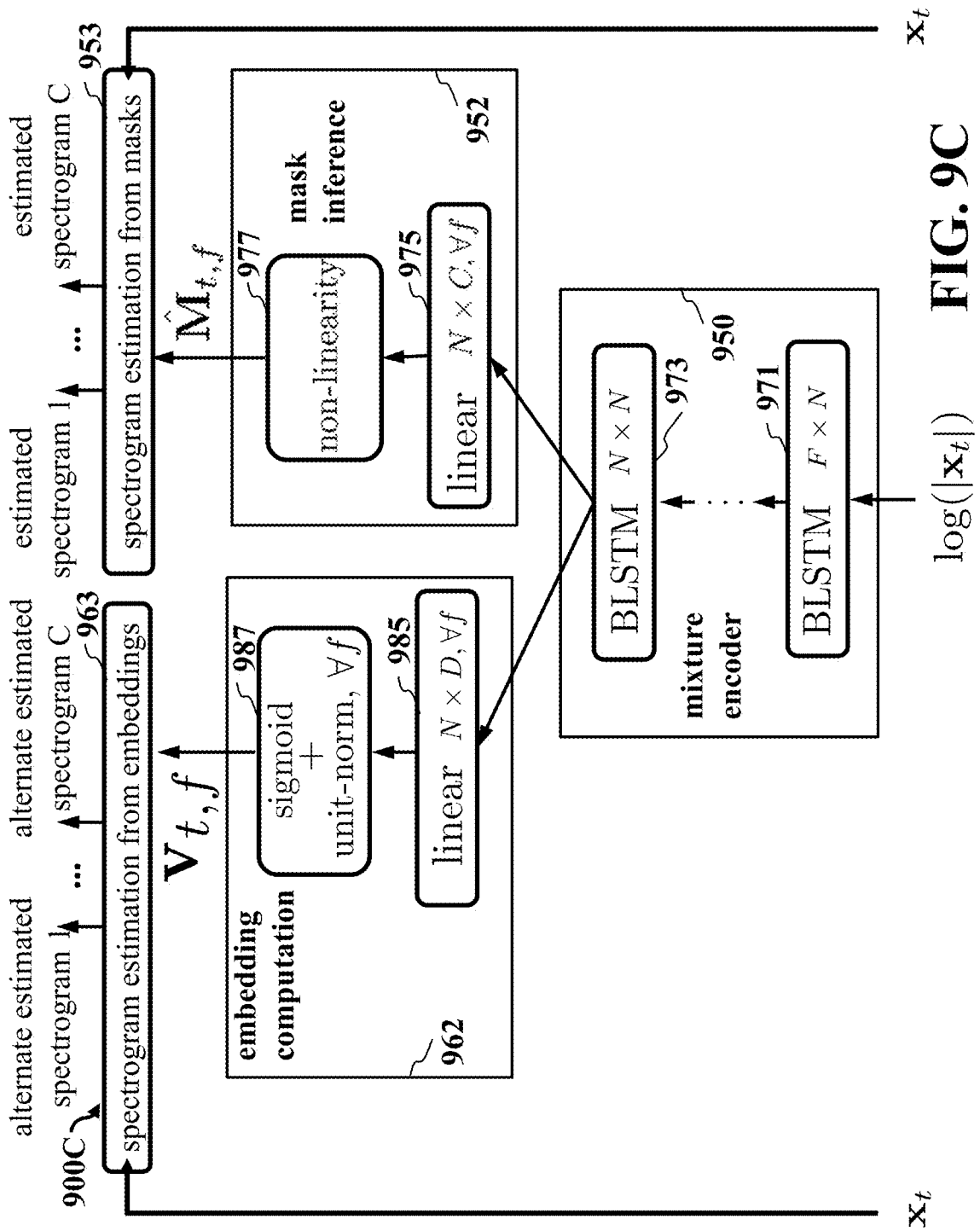
FIG. 9C is a block diagram illustrating a single-channel chimera network architecture, according to embodiments of the present disclosure.

FIG. 9C is a block diagram illustrating a single-channel chimera network architecture 900C, according to embodiments of the present disclosure. A sequence of feature vectors obtained from the input mixture, for example the log magnitude of the short-time Fourier transform of the input mixture, is used as input to a mixture encoder 950. For example, the dimension of the input vector in the sequence can be F. The mixture encoder 950 is composed of multiple bidirectional long short-term memory (BLSTM) neural network layers, from the first BLSTM layer 971 to the last BLSTM layer 973. Each BLSTM layer is composed of a forward long short-term memory (LSTM) layer and a backward LSTM layer, whose outputs are combined and use as input by the next layer. For example, the dimension of the output of each LSTM in the first BLSTM layer 971 can be N, and both the input and output dimensions of each LSTM in all other BLSTM layers including the last BLSTM layer 903 can be N.

The output of the last BLSTM layer 973 is used as input to a mask inference module 952, including a linear neural network layer 975 and a non-linearity 977. For each time frame and each frequency in a time-frequency domain, for example the short-time Fourier transform domain, the linear layer 975 uses output of the last BLSTM layer 973 to output C numbers, where C is the number of target speakers. The non-linearity 977 is applied to this set of C numbers for each time frame and each frequency, leading to mask values which indicate, for each time frame, each frequency, and each target speaker, the dominance of that target speaker in the input mixture at that time frame and that frequency. A separation encoding estimation from masks module 953 uses these masks, together with a representation of the input mixture in the time-frequency domain for which the masks were estimated, for example the magnitude short-time Fourier transform domain, to output separation encodings for each target speaker. For example, the separation encoding estimation from masks module 953 can multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

The output of the last BLSTM layer 973 can also be used as input to an embedding computation module 962, including a linear neural network layer 985 and a module implementing a sigmoid non-linearity followed by a unit-norm normalization 987. For each time frame and each frequency in a time-frequency domain, for example the short-time Fourier transform domain, the linear layer 985 uses output of the last BLSTM layer 973 to output a D-dimensional vector, where D is an embedding dimension. The module implementing a sigmoid non-linearity followed by a unit-norm normalization 987 applies a sigmoid to each element of the D-dimension vector, and renormalizes it so that it has unit Euclidean norm, leading to an embedding vector for each time frame and frequency. A separation encoding estimation from embeddings module 963 uses these embedding vectors, together with a representation of the input mixture in the time-frequency domain for which the embeddings were estimated, for example the magnitude short-time Fourier transform domain, to output separation encodings for each target speaker. For example, the separation encoding estimation from embeddings module 963 can use a clustering algorithm such as the k-means algorithm to cluster the embedding vectors into C groups, where C is the number of target speakers, and each group corresponds to time and frequency components that are dominated by a same speaker. A binary mask can be obtained for each speaker, indicating whether a time and frequency component is dominated by that speaker of not. The separation encoding estimation from embeddings module 963 can then multiply the mask for a target speaker with the magnitude short-time Fourier transform of the input mixture to obtain an estimate of the magnitude short-time Fourier transform of the separated signal for that target speaker if it had been observed in isolation, used as separation encoding for that target speaker.

At training time, the output of the last BLSTM layer 973 is used as input both to the mask inference module 952, and to the embedding computation module 962. One or more of the embeddings outputted by the embedding computation module 962, the masks outputted by the mask inference module 952, the separation encodings outputted by the encoding estimation from embeddings module 963, and the separation encodings outputted by the encoding estimation from masks module 953, can be used to compute a training error as described in FIG. 10. At test time, one can also use both modules and combine the separation encodings obtained from each, or one can select to proceed with only one module and use the corresponding separation encodings.

Figure 10:
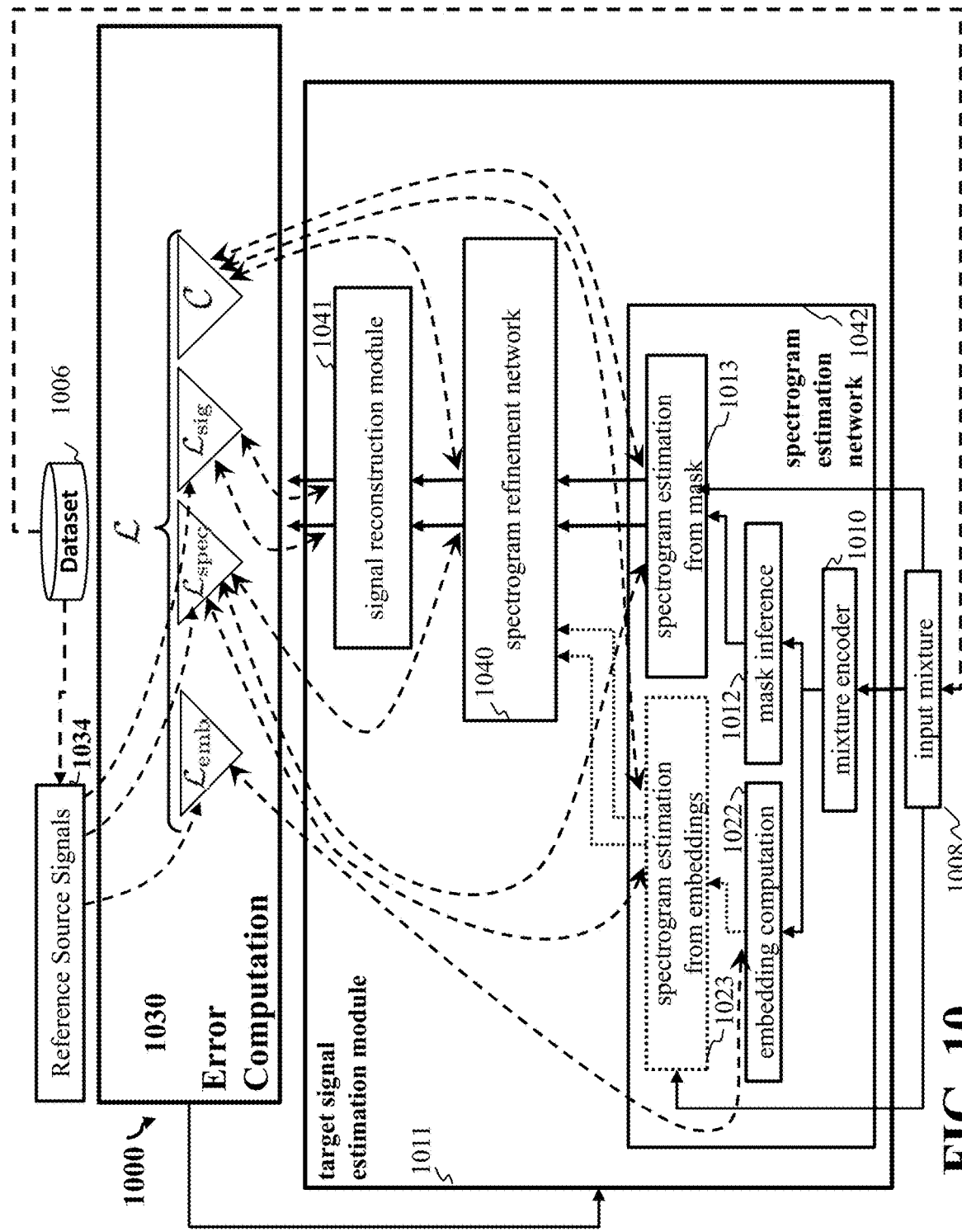
FIG. 10 is a flow diagram illustrating training of a target signal estimation module of an end-to-end audio signal processing system for source separation, wherein training includes an error computation, according to embodiments of the present disclosure.

FIG. 10 is a flow diagram illustrating training of a target signal estimation module of an end-to-end audio signal processing system 1000 for source separation, wherein training includes an error computation, according to embodiments of the present disclosure. The figure illustrates concepts using as example the case of two target sources. The target signal estimation module 1011 includes a spectrogram estimation network 1042, a spectrogram refinement network 1040, and a signal reconstruction module. An Input Mixture 1008 and the corresponding Reference Source Signals 1034 are sampled from a Dataset 1006. The Reference Source Signals correspond to the part of the input mixture 1008 corresponding to each target source observed in isolation. The input mixture 1008 is processed by the spectrogram estimation network 1042 to output an estimated spectrogram for each target speaker. The spectrogram estimation network 1042 includes a mixture encoder 1010, a mask inference module 1012, a spectrogram estimation from mask module 1013, an embedding computation module 1022, and optionally a spectrogram estimation from embedding module 1023.

The mixture encoder 1010 processes the input mixture 1008 to output a mixture encoding. The mixture encoding is further processed by the mask inference module 1012, which estimates a set of masks. The set of masks is used together with the input mixture by the spectrogram estimation from mask module 1013 to obtain an estimated spectrogram for each target source. For example, the spectrogram estimation from mask module 1013 can apply the estimated masks to a time-frequency representation of the input mixture to obtain an estimated time-frequency representation, here referred to as estimated spectrogram, of the separated signal for that target source. The time-frequency representation can for example be the short-time Fourier transform, in which case each mask is applied to the short-time Fourier transform of the input mixture to obtain an estimate of the short-time Fourier transform of the separated signal for that target source, which is an estimate of the short-time Fourier transform of what the isolated signal for that target source would have been if it had been observed in isolation.

The mixture encoding is also further processed by the embedding computation module 1022, which estimates a set of embeddings. A spectrogram estimation from embeddings module 1023 can use to process these embedding vectors, together with the input mixture 1008, to output another set of estimated spectrograms.

These estimated spectrograms from embeddings can be combined with the estimated spectrograms from masks to obtain combined estimated spectrograms, or can be used instead of the estimated spectrograms from masks, to be used as input to the spectrogram refinement network 1040 and subsequent steps. The estimated spectrograms are further processed by the spectrogram refinement network 1040 to obtain refined spectrograms for each source. These refined spectrograms are further processed by a signal reconstruction module, which in the case of the short-time Fourier transform representation applies an inverse STFT to each refined spectrogram. The Error Computation module 1030 can use the outputs of the spectrogram estimation from mask module 1013 and the reference source signals 1034 to compute a spectrogram estimation loss $\mathcal{L}_{spec}$. The Error Computation module 1030 can also use the outputs of the spectrogram estimation from embeddings module 1023 and the reference source signals 1034 to compute the spectrogram estimation loss $\mathcal{L}_{spec}$, in combination with the above spectrogram estimation loss or instead of it. The Error Computation module 1030 can also use the outputs of the spectrogram refinement network 1040 and the reference source signals 1034 to compute the spectrogram estimation loss $\mathcal{L}_{spec}$, in combination with the above spectrogram estimation losses or instead of them. The Error Computation module 1030 can use the outputs of the embedding computation module 1022 and the reference source signals 1034 to compute an embedding loss $\mathcal{L}_{emb}$. The Error Computation module 1030 can use the outputs of the signal reconstruction module and the reference source signals 1034 to compute a signal reconstruction loss $\mathcal{L}_{sig}$. The Error Computation module 1030 can use one or more of the outputs of the spectrogram estimation from masks module 1013, the outputs of the spectrogram estimation from embeddings module 1023, and the outputs of the spectrogram refinement network module 1040, to compute a consistency measure C. A weighted combination of the spectrogram estimation loss, the embedding loss, the signal reconstruction loss, and the consistency measure, is a total loss $\mathcal{L}$. The total loss is used to compute updates for the parameters of the target signal estimation module 1011.

Technical Concepts

Some embodiments of the present disclosure include an end-to-end approach for single-channel speaker-independent multi-speaker speech separation, where time-frequency (T-F) masking, the short-time Fourier transform (STFT), and its inverse (inverse STFT or iSTFT) are represented as layers within a deep network. During experimentation, some experimental approaches, rather than computing a loss on the reconstructed signal as in the present disclosure, used (the experimental approaches) a surrogate loss based on the target STFT magnitudes. However, these experimental approaches ignored the reconstruction error introduced by phase inconsistency. Some embodiments of the present disclosure include loss functions which are directly defined on the reconstructed signals, that are optimized for best separation. In addition, some embodiments train through unfolded iterations of a phase reconstruction algorithm, represented as a series of STFT and inverse STFT layers.

While mask values are typically limited to lie between zero and one for approaches using the mixture phase for reconstruction, this limitation can be less relevant if the estimated magnitudes are to be used together with phase reconstruction. Thus, several activation functions for some embodiments of the present disclosure, are for the output layer of the T-F masking, to allow mask values beyond one. From experimentation, results achieved a state-of-the-art 12.6 dB scale-invariant signal-to-distortion ratio (SI-SDR) and 13.1 dB SDR, revealing advantages for some embodiments toward deep learning based phase reconstruction and representing a fundamental progress towards solving the notoriously-hard cocktail party problem.

During experimentation, experiments were conducted where separation was performed on the magnitude in the time-frequency (T-F) domain and the mixture phase was directly used for time-domain re-synthesis, largely because phase is difficult to estimate. However, experimentation results showed a phase inconsistency problem, especially for speech processing, where there is typically at least half overlap between consecutive frames. This overlap makes the STFT representation of a speech signal highly redundant. As a result, the enhanced STFT representation obtained using the estimated magnitude and mixture phase is not in the consistent STFT domain, meaning that it is not guaranteed that there exists a time-domain signal having that STFT representation.

To improve the consistency, some experimentation focused on iterative methods such as the classic Griffin-Limn algorithm, the multiple input spectrogram inversion (MISI) algorithm, informed source separation using iterative reconstruction (ISSIR), and consistent Wiener filtering, which can recover the clean phase to some extent starting from the mixture phase and a good estimated magnitude by iteratively performing STFTs and iSTFTs. Some approaches tested during experimentation applied iterative algorithms as a post-processing step on the magnitudes produced by deep learning based speech enhancement and separation.

However, results from the experimentation only lead to small improvements, even though the magnitude estimates from DNNs were reasonably good. Upon reflection, this may possibly be because the time-frequency masking is performed without being aware of the later phase reconstruction steps and hence may not produce spectral structures that are appropriate for iterative phase reconstruction. Thus, based on many experiments, the present disclosure presents an end-to-end speech separation algorithm that trains through iterative phase reconstruction via time-frequency masking for signal-level approximation.

Chimera++ Network

To elicit a good phase via phase reconstruction, through experimentation, it was learned that it is necessary to first obtain a good enough magnitude estimate. Based on further experimentation, a multi-task learning approach combining the regularization capability of deep clustering with the ease of end-to-end training of mask inference resulted in yielding significant improvements over the individual models.

At least one key aspect of deep clustering gained from experimentation is to learn a high-dimensional embedding vector for each T-F unit using a powerful deep neural network (DNN), such that the embeddings of the T-F units dominated by the same speaker are close to each other in the embedding space while farther otherwise. In this way, clustering methods like k-means can be applied to the learned embeddings to perform separation at run time, according to our experiments. More specifically, the network can compute a unit-length embedding vector $v_i \in \mathbb{R}^{1 \times D}$ corresponding to the $i^{th}$ T-F element. Similarly, $Y_i \in \mathbb{R}^{1 \times C}$ is a one-hot label vector representing which source in a mixture dominates the $i^{th}$ T-F unit; this information can be derived for training data where the isolated source signals and their mixture are available. Vertically stacking these, we form the embedding matrix $V \in \mathbb{R}^{TF \times D}$ and the label matrix $Y \in \mathbb{R}^{TF \times C}$. The embeddings can be learned by approximating the affinity matrix from the embeddings:

$$\mathcal{L}_{DC,classic}(V, Y) = \|VV^T - YY^T\|_F^2$$
$$= \|V^T V\|_F^2 + \|Y^T Y\|_F^2 - 2\|V^T Y\|_F^2.$$

Based on our experimentation, it was learned that an alternative loss function, which whitens the embedding in a k-means objective, may lead to better separation performance.

$$\mathcal{L}_{DC,W}(V, Y) = \left\| V(V^TV)^{-\frac{1}{2}} - Y(Y^TY)^{-1}Y^TV(V^TV)^{-\frac{1}{2}} \right\|_F^2$$

$$= D - tr\left((V^TV)^{-1}V^TY(Y^TY)^{-1}Y^TV\right).$$

To learn the embeddings, bi-directional LSTM (BLSTM) can be used to model the context information from past and future frames, according to some approaches tested. The network architecture is shown at the bottom of FIG. 9B, where the embedding computation module is a fully-connected layer followed by a non-linearity such as a logistic sigmoid, followed by unit-length normalization for each frequency.

Another permutation-free training scheme was experimented for mask-inference networks. The idea of the experiment was to train a mask-inference network to minimize the minimum loss over all permutations. Then, the phase-sensitive mask (PSM) was used as the training target. Understood from experimentation in phase-sensitive spectrum approximation (PSA) was to truncate the unbounded mask values. Using $T_a^b(x)=\min(\max(x, a), b)$, the truncated PSA (tPSA) objective was $$\mathcal{L}_{tPSA} = \min_{\pi \in \mathcal{P}} \sum^c \left\| \hat{M}_{\pi(c)} \odot |X| - T_0^{\gamma|X|}(|S_c| \odot \cos(\angle S_c - \angle X)) \right\|_1,$$

where $\angle X$ is the mixture phase, $\angle S_c$ the phase of the c-th source, $\mathcal{P}$ the set of permutations on $\{1, \ldots, C\}$, $|X|$ the mixture magnitude, $\hat{M}_c$ the c-th estimated mask, $|S_c|$ the magnitude of the c-th reference source, $\odot$ denotes element-wise matrix multiplication, and $\gamma$ is a mask truncation factor. Sigmoidal activation together with $\gamma=1$ can be used in the output layer of T-F masking, as understood from experimentation. To endow the network with more capability, multiple activation functions that can work with $\gamma>1$ is further discussed in the section titled Activation Functions with Values Beyond One below. After further experimentation was proposed a chimera++ network combining the two approaches via multi-task learning, which is illustrated in FIG. 9C. Wherein the loss function can be a weighted sum of the deep clustering loss and the mask inference loss.

$$\mathcal{L}_{chi_\alpha^{++}} = \alpha \mathcal{L}_{DC,W} + (1-\alpha) \mathcal{L}_{tPSA}$$

Further learned through experimentation is that either the deep clustering output or the mask-inference output may be needed to make predictions at run time, without computing the other.

Iterative Phase Reconstruction

There are multiple target sources to be separated in each mixture according to some embodiments of the present disclosure. One approach of experimentation used the Griffin-Lim algorithm which performs iterative reconstruction for each source independently. However, other approaches in the experiments of the present disclosure utilized the MISI algorithm to reconstruct the clean phase of each source starting from the estimated magnitude of each source and the mixture phase, where the sum of the reconstructed time-domain signals after each iteration can be constrained to be equal to the mixture signal. Noted from experimentation is that the estimated magnitudes remain fixed during iterations, while the phase of each source can be iteratively reconstructed. For example, some approaches included the phase reconstruction that was only added as a post-processing, and it was not part of the objective function during training, which remained computed on the time-frequency representation of the estimated signal, prior to re-synthesis.

The MISI algorithm can be summarized as follows.
Input: Mixture time-domain signal x, mixture complex spectrogram X, mixture phase $\angle X$, enhanced magnitudes $\hat{A}_c = \hat{M}_c \odot |X|$ for $c=1, \ldots, C$, and iteration number K.
Output: Reconstructed phase $\hat{\theta}_c^{(K)}$ and signal $\hat{s}_c^{(K)}$ for $c=1, \ldots, C$.
Initialization step: $\hat{s}_c^{(0)} = \text{iSTFT}(\hat{A}_c, \angle X)$, for $c=1, \ldots, C$.
Iterations: for $i=1, \ldots, K$, do:

$$\delta^{(i-1)} = x - \sum_{c=1}^{C} \hat{s}_c^{(i-1)};$$

$$\hat{\theta}_c^{(i)} = \angle \text{STFT}\left(\hat{s}_c^{(i-1)} + \frac{\delta^{(i-1)}}{C}\right), \quad \text{for } c = 1, \ldots, C;$$

$$\hat{s}_c^{(i)} = \text{iSTFT}(\hat{A}_c, \hat{\theta}_c^{(i)}), \quad \text{for } c = 1, \ldots, C.$$

Waveform Approximation

The first step in phase reconstruction algorithms such as MISI tested during experimentation to reconstruct a waveform from a time-frequency domain representation used the inverse STFT. Some of these approaches considered a first objective function computed on the waveform reconstructed by iSTFT, denoted as waveform approximation (WA), and represent iSTFT as a layer on top of the mask inference layer, so that end-to-end optimization may be performed. The label permutation problem was later learned to be resolved by minimizing the minimum $L_1$ loss of all the permutations at the waveform level during experimentation. Noted, was that the model can be trained this way as WA. The objective function to train this model can be $$\mathcal{L}_{WA} = \min_{\pi \in \mathcal{P}} \sum^c \left\| \hat{s}_{\pi(c)}^{(0)} - s_c \right\|_1,$$

where $s_c$ denotes the time-domain signal of source c, and $\hat{s}_c^{(0)}$ denotes the c-th time-domain signal obtained by inverse STFT from the combination of the c-th estimated magnitude and the mixture phase. Note that mixture phase can still be used here and no phase reconstruction is yet performed. Wherein this corresponds to the initialization step in the MISI Algorithm.

Unfolded Iterative Phase Reconstruction

Some embodiments unfold the iterations in the MISI algorithm as various deterministic layers in a neural network. This can be achieved by further growing several layers representing STFT and iSTFT operations on top of the mask inference layer. By performing end-to-end optimization that trains through MISI, the network can become aware of the later iterative phase reconstruction steps and learn to produce estimated magnitudes that are well adapted to subsequent processing, hence producing better phase estimates for separation. The model trained this way is denoted as WA-MISI-K, where K≥1 is the number of unfolded MISI iterations. The objective function is $$\mathcal{L}_{WA-MISI-K} = \min_{\pi \in \mathcal{P}} \sum^c \left\| \hat{s}_{\pi(c)}^{(K)} - s_c \right\|_1,$$

where $\hat{s}_c^{(K)}$ denotes the c-th time-domain signal obtained after K MISI iterations. The whole separation network, including unfolded phase reconstruction steps at the output of the mask inference head of the Chimera++ network, can be illustrated as in FIG. 3A and FIG. 3B. The STFT and iSTFT can be implemented using deep learning toolkits as deterministic layers efficiently computed on a GPU and through which backpropagation can be performed at training time.

Training Through K MISI Iterations.

Activation Functions with Values Beyond One

Sigmoidal units can be used in the output layer of deep learning based T-F masking, partly because they can model well data with bi-modal distribution, such as the ideal ratio mask (IRM) and its variants, based on experimentation. Restricting the possible values of the T-F mask to lie in [0,1] is also reasonable when using the mixture phase for reconstruction: indeed, T-F mask values larger than one would in theory be needed in regions where interferences between sources result in a mixture magnitude smaller than that of a source; but the mixture phase is also likely to be different from the phase of that source in such regions, in which case it is more rewarding in terms of objective measure to oversuppress than to go even further in a wrong direction. This is no longer valid if we consider phase reconstruction in the optimization. Moreover, capping the mask values to be between zero and one is more likely to take the enhanced magnitude further away from the consistent STFT domain, posing potential difficulties for later phase reconstruction.

To obtain clean magnitudes, the oracle mask should be $|S_c|/|X|$ (also known as the FFT mask or the ideal amplitude mask). Clearly, this mask can go beyond one, because the underlying sources, although statistically independent, may have opposite phase at a particular T-F unit, therefore cancelling with each other and producing a mixture magnitude that is smaller than the magnitude of a given source. It is likely much harder to predict the mask values of such T-F units, but we believe that it is still possible based on contextual information.

In our experimentation, we truncate the values in PSM to the range [0,2] (i.e., $\gamma=2$ in the equation for $\mathcal{L}_{tPSA}$), as only a small percentage of mask values goes beyond this range in practice. Multiple activation functions can be utilized in the output layer. We here consider several possible functions, although other functions could also be considered:

doubled sigmoid: sigmoid non-linearity multiplied by 2;
clipped ReLU: ReLU non-linearity clipped to [0,2];
convex softmax: the output non-linearity is a three-dimensional softmax for each source at each T-F unit. It is used to compute a convex sum between the values 0, 1, and 2: $y=[x_0, x_1, x_2][0,1,2]^T$ where $[x_0, x_1, x_2]$ is the output of the softmax. This activation function is designed to model the three modes concentrated at 0, 1 and 2 in the histogram of the PSM.

Figure 11:
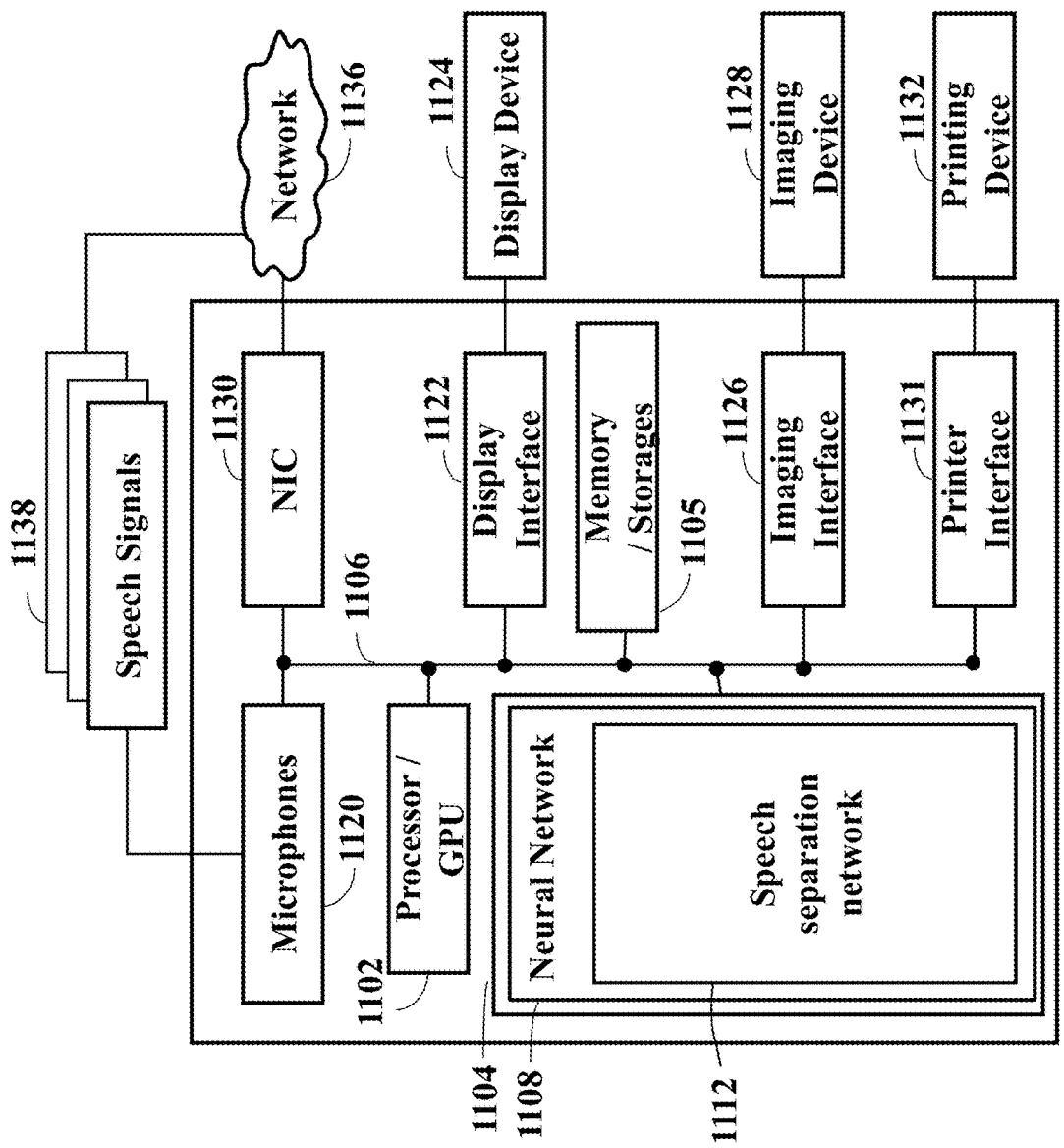
FIG. 11 illustrates a block diagram of alternative audio signal processing systems for speech separation, in particular, FIG. 11 includes a speech separation network, according to embodiments of the present disclosure

FIG. 11 illustrates a block diagram of alternative audio signal processing systems for speech separation, in particular, FIG. 11 includes a speech separation network.

Referring to FIG. 11, system includes a processor 1102 configured to execute stored instructions, as well as a memory 1104 that stores instructions regarding a neural network 1108 including a speech separation network 1112. The processor 1102 can be a single core processor, a multi-core processor, a graphic processing unit (GPU), a computing cluster, or any number of other configurations. The memory/storage 1105 can include random access memory (RAM), read only memory (ROM), flash memory, or any other suitable memory systems. The memory 1105 can also include a hard drive, an optical drive, a thumbdrive, an array of drives, or any combinations thereof. The processor 1102 is connected through a bus 1106 to one or more input and output interfaces/devices.

The memory 1105 stores the neural network 1108 trained to transform acoustic signals including mixtures of speech signals into separated speech signals and the processor 1102 executing the stored instructions performs the speech separation using the neural network 1108 retrieved from the memory 1105. The neural network 1108 is trained to transform acoustic signals including mixtures of speech signals into separated speech signals. The neural network 1108 may include a speech separation network 1112, which is trained to estimate separated signals from acoustic features of the acoustic signals.

In one embodiment, the neural network 1108 also includes a feature extractor (not shown) configured to extract the acoustic features from the single-channel signal to be used by the speech separation network. The feature extractor is a differentiable function and thus can be connected into the single end-to-end neural network. Examples of the differentiable function include a complex STFT of the signal, a magnitude STFT of the signal, a Mel function of a magnitude of the channel signal, and a bark function of a magnitude of the channel signal.

In one implementation, the differentiable function is another neural sub-network trained to extract the acoustic features from the channel signal. In this implementation, the feature extraction sub-network is jointly trained with the speech separation network.

A differentiable function can be optimized using a gradient descent method so that the output of the function approaches a target output for a given input. The function can also be approximated to an unknown mapping function using paired input and target output samples so that all the input samples are mapped to the corresponding target samples as correctly as possible.

Since composition of differentiable functions is also differentiable, we can combine cascaded processing modules, each of which is designed as a differentiable function, to optimize them jointly.

Neural networks are differentiable functions. According to the present disclosure, all the components of end-to-end speech separation can be implemented with differentiable functions including multiple neural networks.

The system can include an input interface, i.e. microphone 1120, to accept speech signals and an output interface, i.e. loudspeaker interface 1122, to render the separated signals. For example, multiple microphones 1120 can convert sound into multi-channel speech signals 1138. Additionally, or alternatively, the input interface can include a network interface controller (NIC) 1130 adapted to connect the system through the bus 1106 to a network 1136. Through the network 1136, the speech signal 1138 can be downloaded and stored for further processing.

Still referring to FIG. 11, other examples of the output interface can include an imaging interface 1126, and a printer interface 1130. For example, the system can be linked through the bus 1106 to a display interface 1122 adapted to connect the system to a display device 1714, wherein the display device 1124 can include a computer monitor, camera, television, projector, or mobile device, among others.

Additionally, or alternatively, the system can be connected to an imaging interface 1126 adapted to connect the system to an imaging device 1128. The imaging device 1128 can include a camera, computer, scanner, mobile device, a webcam, or any combination thereof. Additionally, or alternatively, the system can be connected to a printer interface 1131 adapted to connect the system to a printing device 1132. The printing device 1132 can include a liquid inkjet printer, solid ink printer, large-scale commercial printer, thermal printer, UV printer, or dye-sublimation printer, among others.

FIG. 12 is a schematic illustrating by non-limiting example a computing apparatus 1200 that can be used to implement some techniques of the methods and systems, according to embodiments of the present disclosure. The computing apparatus or device 1200 represents various forms of digital computers, such as laptops, desktops, workstations, personal digital assistants, servers, blade servers, mainframes, and other appropriate computers.

The computing device 1200 can include a power source 1208, a processor 1209, a memory 1210, a storage device 1211, all connected to a bus 1250. Further, a high-speed interface 1212, a low-speed interface 1213, high-speed expansion ports 1214 and low speed connection ports 1215, can be connected to the bus 1250. Also, a low-speed expansion port 1216 is in connection with the bus 1250. Contemplated are various component configurations that may be mounted on a common motherboard, by non-limiting example, 1230, depending upon the specific application. Further still, an input interface 1217 can be connected via bus 1250 to an external receiver 1206 and an output interface 1218. A receiver 1219 can be connected to an external transmitter 1207 and a transmitter 1220 via the bus 1250. Also connected to the bus 1250 can be an external memory 1204, external sensors 1203, machine(s) 1202 and an environment 1201. Further, one or more external input/output devices 1205 can be connected to the bus 1250. A network interface controller (NIC) 1221 can be adapted to connect through the bus 1250 to a network 1222, wherein data or other data, among other things, can be rendered on a third party display device, third party imaging device, and/or third party printing device outside of the computer device 1200.

Contemplated is that the memory 1210 can store instructions that are executable by the computer device 1200, historical data, and any data that can be utilized by the methods and systems of the present disclosure. The memory 1210 can include random access memory (RAM), read only memory (ROM), flash memory, or any other suitable memory systems. The memory 1210 can be a volatile memory unit or units, and/or a non-volatile memory unit or units. The memory 1210 may also be another form of computer-readable medium, such as a magnetic or optical disk.

Figure 12A:
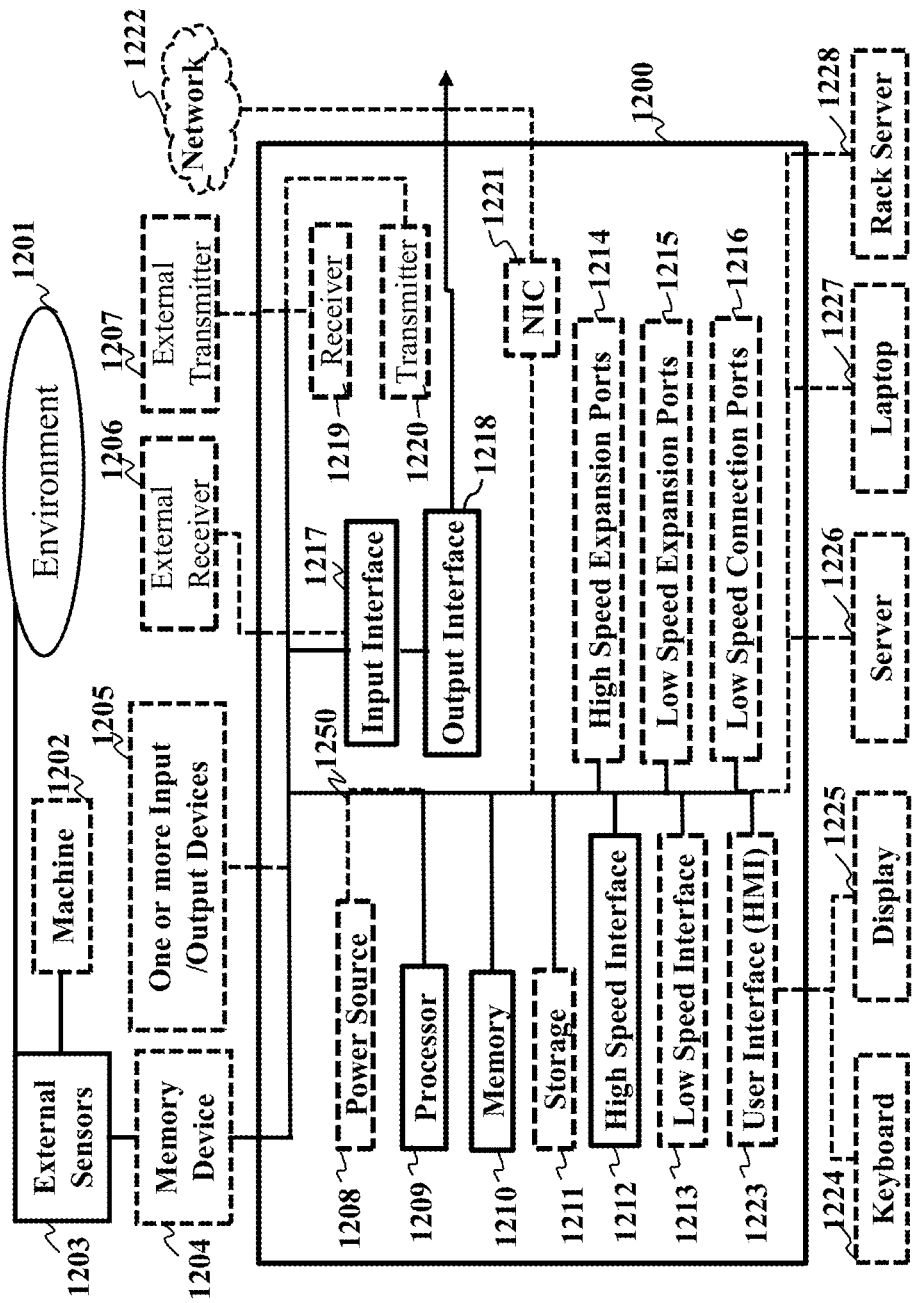
FIG. 12A is a schematic illustrating a computing apparatus that can be used to implement some techniques of the methods and systems, according to embodiments of the present disclosure.

Still referring to FIG. 12A, a storage device 1211 can be adapted to store supplementary data and/or software modules used by the computer device 1200. For example, the storage device 1211 can store historical data and other related data as mentioned above regarding the present disclosure. Additionally, or alternatively, the storage device 1211 can store historical data similar to data as mentioned above regarding the present disclosure. The storage device 1211 can include a hard drive, an optical drive, a thumb-drive, an array of drives, or any combinations thereof. Further, the storage device 1211 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1209), perform one or more methods, such as those described above.

The system can be linked through the bus 1250 optionally to a display interface or user Interface (HMI) 1223 adapted to connect the system to a display device 1225 and keyboard 1224, wherein the display device 1225 can include a computer monitor, camera, television, projector, or mobile device, among others.

Still referring to FIG. 12A, the computer device 1200 can include a user input interface 1217 adapted to a printer interface (not shown) can also be connected through bus 1250 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1212 manages bandwidth-intensive operations for the computing device 1200, while the low-speed interface 1213 manages lower bandwidth-intensive operations. Such allocation of functions is an example only. In some implementations, the high-speed interface 1212 can be coupled to the memory 1210, a user interface (HMI) 1223, and to a keyboard 1224 and display 1225 (e.g., through a graphics processor or accelerator), and to the high-speed expansion ports 1214, which may accept various expansion cards (not shown) via bus 1250. In the implementation, the low-speed interface 1213 is coupled to the storage device 1211 and the low-speed expansion port 1215, via bus 1250. The low-speed expansion port 1215, which may include various communication ports (e.g., USB, Bluetooth, Ethernet, wireless Ethernet) may be coupled to one or more input/output devices 1205, and other devices a keyboard 1224, a pointing device (not shown), a scanner (not shown), or a networking device such as a switch or router, e.g., through a network adapter.

Still referring to FIG. 12A, the computing device 1200 may be implemented in a number of different forms, as shown in the figure. For example, it may be implemented as a standard server 1226, or multiple times in a group of such servers. In addition, it may be implemented in a personal computer such as a laptop computer 1227. It may also be implemented as part of a rack server system 1228. Alternatively, components from the computing device 1200 may be combined with other components in a mobile device (not shown), such as a mobile computing device of FIG. 12B. Each of such devices may contain one or more of the computing device and the mobile computing device, and an entire system may be made up of multiple computing devices communicating with each other.

Figure 12B:
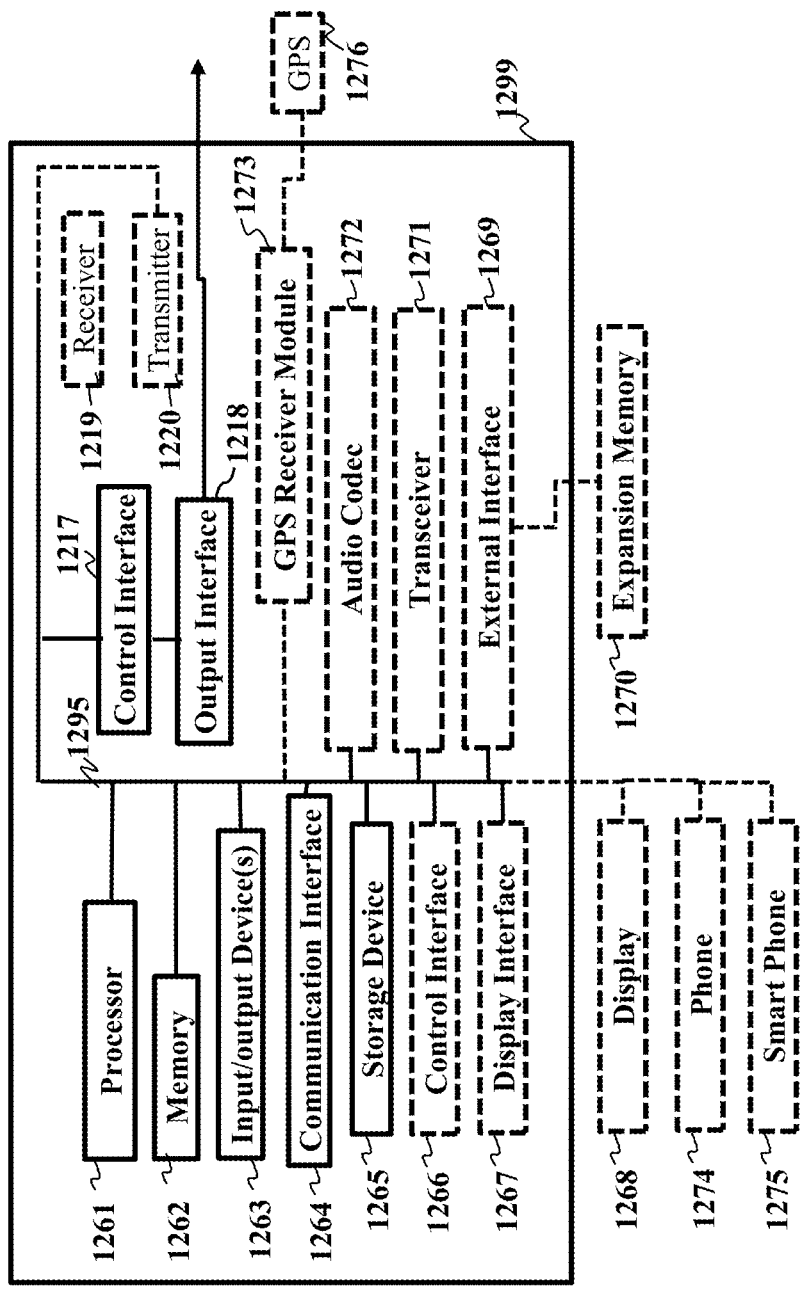
FIG. 12B is a schematic illustrating a mobile computing apparatus that can be used to implement some techniques of the methods and systems, according to embodiments of the present disclosure.

FIG. 12B is a schematic illustrating a mobile computing apparatus that can be used to implement some techniques of the methods and systems, according to embodiments of the present disclosure. The mobile computing device 1299 includes a bus 1295 connecting a processor 1261, a memory 1262, an input/output device 1263, a communication interface 1264, among other components. The bus 1295 can also be connected to a storage device 1265, such as a micro-drive or other device, to provide additional storage.

Referring to FIG. 12B, the processor 1261 can execute instructions within the mobile computing device, including instructions stored in the memory 1262. The processor 1261 may be implemented as a chipset of chips that include separate and multiple analog and digital processors. The processor 1261 may provide, for example, for coordination of the other components of the mobile computing device, such as control of user interfaces, applications run by the mobile computing device, and wireless communication by the mobile computing device 1800B. Contemplated are various component configurations that may be mounted on a common motherboard, by non-limiting example, 1299, depending upon the specific application.

The processor 1261 may communicate with a user through a control interface 1266 and a display interface 1267 coupled to the display 1268. The display 1268 may be, for example, a TFT (Thin-Film-Transistor Liquid Crystal Display) display or an OLED (Organic Light Emitting Diode) display, or other appropriate display technology. The display interface 1267 may comprise appropriate circuitry for driving the display 1268 to present graphical and other information to a user. The control interface 1266 may receive commands from a user and convert them for submission to the processor 1261. In addition, an external interface 1269 may provide communication with the processor 1861, so as to enable near area communication of the mobile computing device with other devices. The external interface 1269 may provide, for example, for wired communication in some implementations, or for wireless communication in other implementations, and multiple interfaces may also be used.

Still referring to FIG. 12B, the memory 1262 stores information within the mobile computing device. The memory 1262 can be implemented as one or more of a computer-readable medium or media, a volatile memory unit or units, or a non-volatile memory unit or units. An expansion memory 1270 may also be provided and connected to the mobile computing device 1299 through an expansion interface 1269, which may include, for example, a SIMM (single in line memory module) card interface. The expansion memory 1270 may provide extra storage space for the mobile computing device 1299, or may also store applications or other information for the mobile computing device 1299. Specifically, the expansion memory 1270 may include instructions to carry out or supplement the processes described above, and may include secure information also. Thus, for example, the expansion memory 1270 may be providing as a security module for the mobile computing device 1299, and may be programmed with instructions that permit secure use of the mobile computing device. In addition, secure applications may be provided via the SIMM cards, along with additional information, such as placing identifying information on the SIMM card in a non-hackable manner.

The memory 1262 may include, for example, flash memory and/or NVRAM memory (non-volatile random access memory), as discussed below. In some implementations, instructions are stored in an information carrier, that the instructions, when executed by one or more processing devices (for example, processor), perform one or more methods, such as those described above. The instructions can also be stored by one or more storage devices, such as one or more computer or machine readable mediums (for example, the memory 1262, the expansion memory 1270, or memory on the processor 1262). In some implementations, the instructions can be received in a propagated signal, for example, over the transceiver 1271 or the external interface 1269.

The mobile computing apparatus or device of FIG. 12B is intended to represent various forms of mobile devices, such as personal digital assistants, cellular telephones, smartphones, and other similar computing devices. The mobile computing device may communicate wirelessly through the communication interface 1264, which may include digital signal processing circuitry where necessary. The communication interface 1264 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1271 using a radio-frequency. In addition, short-range communication may occur, such as using a Bluetooth, WiFi, or other such transceiver (not shown). In addition, a GPS (Global Positioning System) receiver module 1273 may provide additional navigation and location related wireless data to the mobile computing device, which may be used as appropriate by applications running on the mobile computing device.

The mobile computing device may also communicate audibly using an audio codec 1272, which may receive spoken information from a user and convert it to usable digital information. The audio codec 1272 may likewise generate audible sound for a user, such as through a speaker, e.g., in a handset of the mobile computing device. Such sound may include sound from voice telephone calls, may include recorded sound (e.g., voice messages, music files, etc.) and may also include sound generated by applications operating on the mobile computing device.

Still referring to FIG. 12B, the mobile computing device may be implemented in a number of different forms, as shown in the figure. For example, it may be implemented as a cellular telephone 1274. It may also be implemented as part of a smart-phone 1275, personal digital assistant, or other similar mobile device.

Features

According to aspects of the present disclosure, the spectrogram estimator uses a deep neural network. The spectrogram estimator includes a mask estimation module which outputs a mask estimate value for each target audio signal, and a spectrogram estimate output module which uses the mask estimate value for the one or more target audio signals and the input audio signal, to output the estimated spectrogram for each target audio signal. Wherein at least one mask estimate value is greater than 1.

Another aspect of the present disclosure can include the processing of the spectrogram refinement module includes defining an iterative procedure acting on the set of estimated spectrograms and the input audio feature sequence. Unfolding the iterative procedure into a set of layers, such that there is one layer for each iteration of the procedure, and wherein each layer includes a set of fixed network parameters. Forming a neural network using some fixed network parameters from the sets of fixed network parameters of layers of previous iterations, as variables to be trained, and untying these variables across the layers of previous iterations, by considering the variables as separate variables as each variable is separately applicable to their corresponding layer. Training the neural network to obtain a trained neural network. Transforming the set of estimated spectrograms and the audio feature sequence using the trained neural network to obtain the set of refined spectrograms.

Another aspect of the present disclosure can include the iterative reconstruction algorithm is an iterative phase reconstruction algorithm. wherein the iterative phase reconstruction algorithm is the Multiple Input Spectrogram Inversion (MIST) algorithm. Wherein the iterative phase reconstruction algorithm is the Griffin-Limn algorithm.

An aspect can include the error on the target audio signal estimates includes a distance between the target audio signal estimates and the reference target audio signals. Further, an aspect can include the error on the target audio signal estimates includes a distance between the spectrograms of target audio signal estimates and the spectrograms of the reference target audio signals. Further still, an aspect can include the extracting by spectrogram estimator includes a feature extraction module, such that the feature extraction module extracts the input audio signal from the input audio signal. It is possible that the received audio signal includes one of one or more speakers, noise, music, environmental sounds, machine sound or some combination thereof.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An audio signal processing system for transforming an input audio signal, wherein the input audio signal includes a mixture of one or more target audio signals, the audio signal processing system comprising:
   a memory including stored executable instructions and a stored module, such that the stored module transforms the input audio signal to obtain target audio signal estimates;
   an input interface to receive the input audio signal,
   a processor in communication with the memory and the input interface, wherein the processor implements steps of the stored module by
      a spectrogram estimator of the stored module to extract an audio feature sequence from the input audio signal, and process the audio feature sequence to output a set of estimated spectrograms, wherein the set of estimated spectrograms includes an estimated spectrogram for each target audio signal;
      a spectrogram refinement module of the stored module to process the set of estimated spectrograms and the audio feature sequence, to output a set of refined spectrograms, such that the set of refined spectrograms includes a refined spectrogram for each target audio signal, and wherein using the spectrogram refinement module is based on an iterative reconstruction algorithm;
      a signal refinement module of the stored module to process the set of refined spectrograms for the one or more target audio signals, to obtain target audio signal estimates, such that there is a target audio signal estimate for each target audio signal; and
   an output interface to output the target audio signal estimates,
   wherein parameters of the stored module are trained using training data by minimizing an error using an optimizer stored in the memory, wherein the error includes one or more of an error on the set of refined spectrograms, an error including a consistency measurement on the set of refined spectrograms, or an error on the target audio signal estimates.

2. The audio signal processing system of claim 1, wherein the spectrogram estimator uses a deep neural network.

3. The audio signal processing system of claim 1, wherein the spectrogram estimator includes a mask estimation module which outputs a mask estimate value for each target audio signal, and a spectrogram estimate output module which uses the mask estimate value for the one or more target audio signals and the input audio signal, to output the estimated spectrogram for each target audio signal.

4. The audio signal processing system of claim 3, wherein at least one mask estimate value is greater than 1.

5. The audio signal processing system of claim 1, wherein the spectrogram refinement module comprises:
   defining an iterative procedure acting on the set of estimated spectrograms and the input audio feature sequence;
   unfolding the iterative procedure into a set of layers, such that there is one layer for each iteration of the iterative procedure, and wherein each layer includes a set of fixed network parameters;
   forming a neural network using fixed network parameters from the sets of fixed network parameters of layers of previous iterations, as variables to be trained, and untying these variables across the layers of previous iterations, by using the variables as separate variables as each variable is separately applicable to their corresponding layer;
   training the neural network to obtain a trained neural network; and
   transforming the set of estimated spectrograms and the audio feature sequence using the trained neural network to obtain the set of refined spectrograms.

6. The audio signal processing system of claim 1, wherein the iterative reconstruction algorithm is an iterative phase reconstruction algorithm.

7. The audio signal processing system of claim 6, wherein the iterative phase reconstruction algorithm is the Multiple Input Spectrogram Inversion (MISI) algorithm.

8. The audio signal processing system of claim 6, wherein the iterative phase reconstruction algorithm is the Griffin-Lim algorithm.

9. The audio signal processing system of claim 1, wherein the error on the target audio signal estimates includes a distance between the target audio signal estimates and reference target audio signals.

10. The audio signal processing system of claim 1, wherein the error on the target audio signal estimates includes a distance between the estimated spectrograms of target audio signal and the refined spectrograms of the target audio signals.

11. The audio signal processing system of claim 1, wherein the spectrogram estimator includes a feature extraction module, such that the feature extraction module extracts the input audio signal from the input audio signal.

12. The audio signal processing system of claim 1, wherein a received audio signal includes one or more of one or more speakers, noise, music, environmental sounds, machine sound.

13. The audio signal processing system of claim 1, wherein the error further includes an error on the set of estimated spectrograms.

14. A method for transforming input audio signals, comprising the steps of:
using a module for transforming an input audio signal of the input audio signals, such that the input audio signal includes a mixture of one or more target audio signals, wherein the module transforms the input audio signal, to obtain target audio signal estimates;
using a spectrogram estimator of the model, to extract an audio feature sequence from the input audio signal, and process the audio feature sequence to output a set of estimated spectrograms, wherein the set of estimated spectrograms includes an estimated spectrogram for each target audio signal;
using a spectrogram refinement module of the module to process the set of estimated spectrograms and the audio feature sequence, to output a set of refined spectrograms, such that the set of refined spectrograms includes a refined spectrogram for each target audio signal, and wherein using the spectrogram refinement module is based on an iterative reconstruction algorithm;
using a signal refinement module of the module to process the set of refined spectrograms for the one or more target audio signals, to obtain target audio signal estimates, such that there is a target audio signal estimate for each target audio signal; and
outputting the target audio signal estimates, wherein parameters of the stored module are trained using training data by minimizing an error using an optimizer stored in a memory, wherein the error includes one or more of an error on the set of refined spectrograms, an error including a consistency measurement on the set of refined spectrograms, or an error on the target audio signal estimates, and wherein the steps are performed by a processor in communication with an output device and the memory having stored executable instructions, such that the module is stored in the memory.

15. The method of claim 14, wherein the spectrogram estimator includes a mask estimation module which outputs a mask estimate value for each target audio signal, and a spectrogram estimate output module which uses the mask estimate value for the one or more target audio signals and the input audio signal, to output the estimated spectrogram for each target audio signal, wherein at least one mask estimate value is greater than 1.

16. The method of claim 14, wherein the processing of the spectrogram refinement module comprises:
defining an iterative procedure acting on the set of estimated spectrograms and the input audio feature sequence;
unfolding the iterative procedure into a set of layers, such that there is one layer for each iteration of the iterative procedure, and wherein each layer includes a set of fixed network parameters;
forming a neural network using fixed network parameters from the sets of fixed network parameters of layers of previous iterations, as variables to be trained, and untying these variables across the layers of previous iterations, by using the variables as separate variables as each variable is separately applicable to their corresponding layer;
training the neural network to obtain a trained neural network; and
transforming the set of estimated spectrograms and the audio feature sequence using the trained neural network to obtain the set of refined spectrograms.

17. The method of claim 14, wherein the iterative reconstruction algorithm is an iterative phase reconstruction algorithm.

18. The method of claim 14, wherein the optimizer includes a gradient-descent based algorithm.

19. An audio signal processing system for transforming input audio signals, the audio signal processing system comprising:
a memory including stored executable instructions and a stored module, such that the stored module transforms the input audio signal of the input audio signals to obtain target audio signal estimates, wherein input audio signal includes a mixture of one or more target audio signals;
an input interface to receive the input audio signal;
a processor in communication with the memory and the input interface, wherein the processor implements steps of the stored module by
a spectrogram estimator of the stored module to extract an audio feature sequence from the input audio signal, and process the audio feature sequence to output a set of estimated spectrograms, wherein the set of estimated spectrograms includes an estimated spectrogram for each target audio signal;
a spectrogram refinement module of the stored module to process the set of estimated spectrograms and the audio feature sequence, to output a set of refined spectrograms, such that the set of refined spectrograms includes a refined spectrogram for each target audio signal, and wherein using the spectrogram refinement module is based on an iterative reconstruction algorithm;
a signal refinement module of the stored module to process the set of refined spectrograms for the one or more target audio signals, to obtain target audio signal estimates, such that there is a target audio signal estimate for each target audio signal; and
an output interface to output the target audio signal estimates,
wherein parameters of the stored module are trained using training data by minimizing an error using an optimizer stored in the memory, wherein the error includes an error on the set of refined spectrogram or an error on the target audio signal estimates or both.

20. An audio signal processing system for transforming input audio signals, the audio signal processing comprising:
a sound detecting device configured to acquire the input audio signal of the input audio signals from an environment;

a signal input interface device configured to receive and transmit the input audio signal, wherein the input audio signal includes a mixture of one or more target audio signals;

an audio signal processing device configured to process the input audio signal, wherein the audio signal processing device comprises:

a hardware processor configured to connected to a memory, the memory configured to input/output data, wherein the hardware processor executes the steps of a module:

accessing the module stored in the memory, such that the stored module transforms the input audio signal to obtain target audio signal estimates;

a spectrogram estimator of the stored module, to extract an audio feature sequence from the input audio signal, and process the audio feature sequence to output a set of estimated spectrograms, wherein the set of estimated spectrograms includes an estimated spectrogram for each target audio signal;

a spectrogram refinement module of the stored module to process the set of estimated spectrograms and the audio feature sequence, to output a set of refined spectrograms, such that the set of refined spectrograms includes a refined spectrogram for each target audio signal, and wherein using the spectrogram refinement module is based on an iterative reconstruction algorithm;

a signal refinement module of the stored module to process the set of refined spectrograms for the one or more target audio signals, to obtain target audio signal estimates, such that there is a target audio signal estimate for each target audio signal; and an output interface to output the target audio signal estimates, wherein parameters of the stored module are trained using training data by minimizing an error using an optimizer stored in the memory, wherein the error includes one or more of an error on the set of refined spectrograms, an error including a consistency measurement on the set of refined spectrograms, or an error on the target audio signal estimates.

21. An audio signal processing system for transforming an input audio signal from a single-channel signal, the audio signal processing system includes an end-to-end approach for single-channel speaker-independent multi-speaker speech separation, the audio signal processing system comprising:

a memory including stored executable instructions and a stored module, such that the stored module transforms the input audio signal to obtain target audio signal estimates;

a processor in communication with the memory, wherein the processor implements steps of the stored module by a spectrogram estimator of the stored module receives the input audio signal from the single-channel signal, to extract an audio feature sequence, and process the audio feature sequence to output a set of estimated spectrograms, wherein the set of estimated spectrograms includes an estimated spectrogram for each target audio signal;

a spectrogram refinement module of the stored module to process the set of estimated spectrograms and the audio feature sequence, to output a set of refined spectrograms, such that the set of refined spectrograms includes a refined spectrogram for each target audio signal, and wherein using the spectrogram refinement module is based on an iterative reconstruction algorithm;

a signal refinement module of the stored module to process the set of refined spectrograms for the one or more target audio signals, to obtain target audio signal estimates, such that there is an target audio signal estimate for each target audio signal; and an output interface to output the target audio signal estimates, wherein parameters of the stored module are trained using training data by minimizing an error using an optimizer stored in the memory, wherein the error includes one or more of an error on the set of refined spectrograms, an error including a consistency measurement on the set of refined spectrograms, or an error on the target audio signal estimates.

* * * * *